(12) United States Patent
Clapp et al.

(10) Patent No.: US 8,854,714 B2
(45) Date of Patent: *Oct. 7, 2014

(54) COLORED CONDUCTIVE FLUIDS FOR ELECTROWETTING AND ELECTROFLUIDIC TECHNOLOGIES

(75) Inventors: Lisa Clapp, Cincinnati, OH (US); Jason Heikenfeld, Cincinnati, OH (US); April Milarcik, Cincinnati, OH (US); Russell J. Schwartz, Cincinnati, OH (US); Stanislav G. Vilner, South Lebanon, OH (US); Manjeet Dhindsa, Eindhoven (NL); Stephanie Chevalliot, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/388,581

(22) PCT Filed: Aug. 4, 2010

(86) PCT No.: PCT/US2010/044441
§ 371 (c)(1),
(2), (4) Date: Mar. 5, 2012

(87) PCT Pub. No.: WO2011/017446
PCT Pub. Date: Feb. 10, 2011

(65) Prior Publication Data
US 2012/0154896 A1  Jun. 21, 2012

Related U.S. Application Data

(60) Provisional application No. 61/231,156, filed on Aug. 4, 2009.

(51) Int. Cl.
*G02F 1/03* (2006.01)
*G02F 1/15* (2006.01)
*G02B 1/06* (2006.01)
*G02B 5/23* (2006.01)
*G02B 26/00* (2006.01)

(52) U.S. Cl.
CPC .................................. *G02B 26/004* (2013.01)
USPC ............ 359/245; 359/265; 359/665; 252/586

(58) Field of Classification Search
USPC ......... 359/296, 265–275, 665–667, 290–292, 359/223–225, 243, 260–263, 276, 244, 359/238; 252/586
See application file for complete search history.

(56) References Cited

U.S. PATENT DOCUMENTS 7,403,325 B2  7/2008  Chopra et al.
7,548,363 B2  6/2009  Hayes et al.
(Continued)

FOREIGN PATENT DOCUMENTS

EP    1887406       2/2008
EP    1 975 214 A1  10/2008
(Continued)

OTHER PUBLICATIONS

Chinese Search Report, First Search, for Application No. 201080043651.9.
(Continued)

*Primary Examiner* — Dwayne A Pinkney
(74) *Attorney, Agent, or Firm* — Frost Brown Todd LLC

(57) ABSTRACT

Colored conductive fluids for electrowetting or electrofluidic devices, and the devices themselves, are disclosed. The colored conductive fluid includes a polar solvent and a colorant selected from a pigment and/or a dye. The polar solvent has (a) a dynamic viscosity of 0.1 cP to 1000 cP at 25° C., (b) a surface tension of 25 dynes/cm to 90 dynes/cm at 25° C., and (c) an electrowetting relative response of 20% to 80%. The colored conductive fluid itself can have an electrical conductivity from 0.1 μS/cm to 3,000 μS/cm and can have no greater than 500 total ppm of monatomic ions with ionic radii smaller than 2.0 Å and polyatomic ions with ionic radii smaller than 1.45 Å. The colored conductive fluid should not cause electrical breakdown of a dielectric in the device in which it is employed. An agent for controlling electrical conductivity can optionally be added to the colored conductive fluid.

33 Claims, 10 Drawing Sheets

(56) References Cited

U.S. PATENT DOCUMENTS

| | | | |
|---|---|---|---|
| 7,729,034 | B2 | 6/2010 | Nakano et al. |
| 7,763,314 | B2 | 7/2010 | Dai et al. |
| 7,791,814 | B2 | 9/2010 | D'ardhuy et al. |
| 7,839,555 | B2 | 11/2010 | Nakano et al. |
| 8,194,304 | B2 | 6/2012 | Niwano et al. |
| 8,323,392 | B2 | 12/2012 | Jones et al. |
| 8,329,067 | B2 | 12/2012 | Nishida et al. |
| 8,329,761 | B2 | 12/2012 | Nair et al. |
| 2007/0047095 | A1 | 3/2007 | Jung et al. |
| 2007/0112189 | A1* | 5/2007 | Ikeda et al. ............. 540/536 |
| 2007/0177276 | A1 | 8/2007 | Liogier D'ardhuy et al. |
| 2007/0189998 | A1 | 8/2007 | Nair et al. |
| 2008/0265211 | A1 | 10/2008 | Rehman et al. |
| 2009/0052004 | A1* | 2/2009 | Nakano et al. ............ 359/270 |

FOREIGN PATENT DOCUMENTS

| | | |
|---|---|---|
| JP | 2005-193325 | 7/2005 |
| JP | 2006-195190 | 7/2006 |
| JP | 2007-310402 | 11/2007 |
| JP | 2008-203282 | 9/2008 |
| JP | 2009-525502 | 7/2009 |
| JP | 2009-526634 | 7/2009 |
| JP | 2009-199013 | 9/2009 |
| JP | 2010-173555 | 8/2010 |
| JP | 4666531 | 4/2011 |
| JP | 2013-506881 | 2/2013 |
| WO | WO 93/07464 | 4/1993 |
| WO | WO 2006/129846 | 12/2006 |
| WO | WO 2007/071904 | 6/2007 |
| WO | WO 2007/088453 | 8/2007 |
| WO | WO 2007/094960 | 8/2007 |
| WO | WO 2008/128691 | 10/2008 |
| WO | WO 2008/128697 | 10/2008 |
| WO | WO 2009/036272 | 3/2009 |

OTHER PUBLICATIONS

English Translation of the Chinese First Office Action for Application No. 201080043651.9.
International Search Report and Written Opinion dated Oct. 1, 2010 for Application No. PCT/US2010/044441.
International Preliminary Report on Patentability dated Feb. 7, 2012 for Application No. PCT/US2010/044441.
Balaji, R., et al., "Ion and Liquid Dependent Dielectric Failure in Electrowetting Systems", Langmuir, 3b2, version 9, Aug. 13, 2009.
Herberth, "Fluid manipulation by Means of Electrowetting-On-Dielectrics" Dissertation on Doctorate from the Faculty of Applied Sciences at the Albert-Ludwigs University of Freiburg in Breisgau, May 2006, pp. 1-184. Retrieved from the internet http://www.freidok.uni-freiburg.de/volltexte/2782/pdf/fluid_manipulation_by_means_of_ewod.pdf.
Manku, G.S., *Theoretical Principles of Inorganic Chemistry*, Tata McGraw-Hill, New Delhi, India, pp. 96-105, 1980.
Mita, I., et al., "Basic Classification and Definitions of Polymerization Reactions", Pure & Appl. Chem., vol. 56, No. 12, opp. 2483-2486, 1994.
International Search Report and Written Opinion dated May 14, 2010 for Application No. PCT/US2010/000767.
English Translation of First Office Action for Chinese Application No. CN 2010800116671.
English Translation of Second Office Action for Chinese Application No. CN 2010800116671.
English Translation of Third Office Action for Chinese Application No. CN 2010800116671.
English Translation of Japanese Office Action dated Feb. 10, 2014 for Application No. JP 2011-554053.
Supplemental European Search Report dated Mar. 15, 2013 for Application No. EP 10751143.
Supplemental European Search Report dated Mar. 19, 2013 for Application No. EP 10807111.
Restriction Requirement dated Sep. 9, 2013 for U.S. Appl. No. 13/202,457.
Non-Final Office Action dated Oct. 29, 2013 for U.S. Appl. No. 13/202,457.
Notice of Allowance dated Jan. 17, 2014 for U.S. Appl. No. 13/202,457.
Notice of Allowance dated Apr. 3, 2014 for U.S. Appl. No. 13/202,457.
Abstract and English Machine Translation of Japanese Patent No. JP 2005-193325.
Abstract and English Machine Translation of Japanese Patent No. JP 2008-203282.
Abstract and English Machine Translation of Japanese Patent No. JP 2010-173555.
Japanese Office Action dated Mar. 17, 2014 for Application No. JP 2012-523734 with English Translation.
Abstract and English Machine Translation of Japanese Application No. JP 2006-195190.
Abstract and English Machine Translation of Japanese Application No. JP 2007-310402.
Abstract and English Machine Translation of Japanese Application No. JP 2009-525502.
Abstract and English Translation of Japanese Application No. JP 2009-526634.
Abstract and English Machine Translation of Japanese Application No. JP 2009-199013.
Abstract and English Translation of Japanese Application No. JP 4666531.
Abstract and English Translation of Japanese Application No. JP 2013-506881.
Second Chinese Office Action dated Jun. 26, 2014 for Application No. 201080043651.9.

* cited by examiner

COLORED CONDUCTIVE FLUIDS FOR ELECTROWETTING AND ELECTROFLUIDIC TECHNOLOGIES

CROSS REFERENCE TO RELATED APPLICATIONS

This application claims the benefit of U.S. Provisional Application No. 61/231,156, filed Aug. 4, 2009, the disclosure of which is hereby incorporated by reference herein in its entirety.

TECHNICAL FIELD

The present invention relates generally to the field of electrowetting, and more specifically to colored conductive fluids for electrowetting or electrofluidic devices and to electrowetting and electrofluidic devices.

BACKGROUND

Electrowetting has become an attractive modulation scheme for a variety of optical applications due in part to a desirable combination of high brightness and contrast ratio, a large viewing angle, and a fast switching speed. In addition, the power consumption of electrowetting displays is relatively low because they do not require front or backlighting. For example, electrowetting has been used to provide optical switches for fiber optics, optical shutters or filters for cameras and guidance systems, optical pickup devices, optical waveguide materials, and video display pixels. The term "electrowetting" describes the effects of an electric field on the contact angle of a liquid with a hydrophobic surface. With an electric field, the liquid distributes over, or wets, a surface that initially repels the liquid resulting in a change in the spectral properties of a device. When the electric field is removed, the contact angle increases and the liquid contracts into an area whereby the spectral properties are returned to the initial state.

Colored immiscible fluids are an indispensible part of electrofluidic and electrowetting devices, where reproduction of visual information and effects are required for the application. Conventional electrowetting devices typically have a colored oil that forms a film over an insulating fluoropolymer. This colored oil film imparts a visible color to the device. When a voltage is applied between a water layer situated above the oil film and an electrode beneath the insulating fluoropolymer, the oil film is disrupted as water electrowets the surface. The disrupted oil film no longer provides color to the device. Once the voltage is removed, the oil preferentially wets the insulating fluoropolymer, the oil film is reformed, and the color is again evident.

Many devices that work with electrowetting use a combination of water and a non-polar fluid also referred to as "an oil". For proper device functioning, non-polar fluids are essentially non-conductive and are not influenced by an electrical field. This is in contrast to polar fluids, which are conductive. To increase electrical conductivity, inorganic salts such as LiCl, NaCl, NaBr, KCl, $CaCl_2$, $NaNO_3$, $MgSO_4$ and the like can be dissolved in the water. However, the physical properties of water, for example, such as expansion at higher temperature, high freezing point, low boiling point, and relatively high vapor pressure, can limit the applications for such devices and can lead to dielectric breakdown. While the problems associated with the use of water and other solvents are being addressed, there still remains a clear need for improved colored fluids for a variety of electrowetting and electrofluidic devices.

It would thus be beneficial to provide an improved colored fluid for electrowetting or electrofluidic devices that, for example, demonstrates minimal or no negative impact on device components, can enhance device performance, and maintain a desired function over a preferred period of time,

SUMMARY

The embodiments of the invention provide colored conductive fluids for an electrowetting or an electrofluidic device.

In one embodiment, the colored conductive fluid includes at least one polar solvent and at least one colorant selected from a pigment and/or a dye. The polar solvent has (a) a dynamic viscosity of 0.1 cP to 1000 cP at 25° C., (b) a surface tension of 25 dynes/cm to 90 dynes/cm at 25° C., and (c) an electrowetting relative response of 20% to 80%. The colored conductive fluid itself has an electrical conductivity from 0.1 µS/cm to 3,000 µS/cm and has no more than 500 total ppm of monatomic ions with ionic radii smaller than 2.0 Å and polyatomic ions with radii smaller than 1.45 Å.

In another embodiment, the colored conductive fluid includes at least one polar solvent and at least one colorant selected from a pigment and/or a dye. The polar solvent has (a) a dynamic viscosity of 0.1 cP to 1000 cP at 25° C., (b) a surface tension of 25 dynes/cm to 90 dynes/cm at 25° C., and (c) an electrowetting relative response of 20% to 80%. The colored conductive fluid itself does not cause electrical breakdown of a poly(2-chloro-paraxylylene) dielectric having a thickness of 400 nm at an applied voltage up to 15V, or does not cause electrical breakdown of an alumina dielectric having a thickness of 100 nm at an applied voltage up to 15V.

An agent for controlling electrical conductivity, which includes a cation and an anion, can optionally be added to the colored conductive fluid, as well as a dispersant, a synergist, a surfactant, a resin, a polymer, a biocide, other additives known in the art, or any combination thereof.

In another embodiment, the electrowetting or electrofluidic device includes the colored conductive fluid. In one example, the device is a pixel in a display.

The use of such colored fluids in display technologies offers improvements in durability, and provides higher levels of chroma and an ability to achieve higher contrast ratios through colorant selection. The colored fluids can also provide fast switching speeds, low power consumption, and greater device durability. The colored fluids also allow devices to be fabricated with thinner dielectrics and thus use lower driving voltage.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1A:
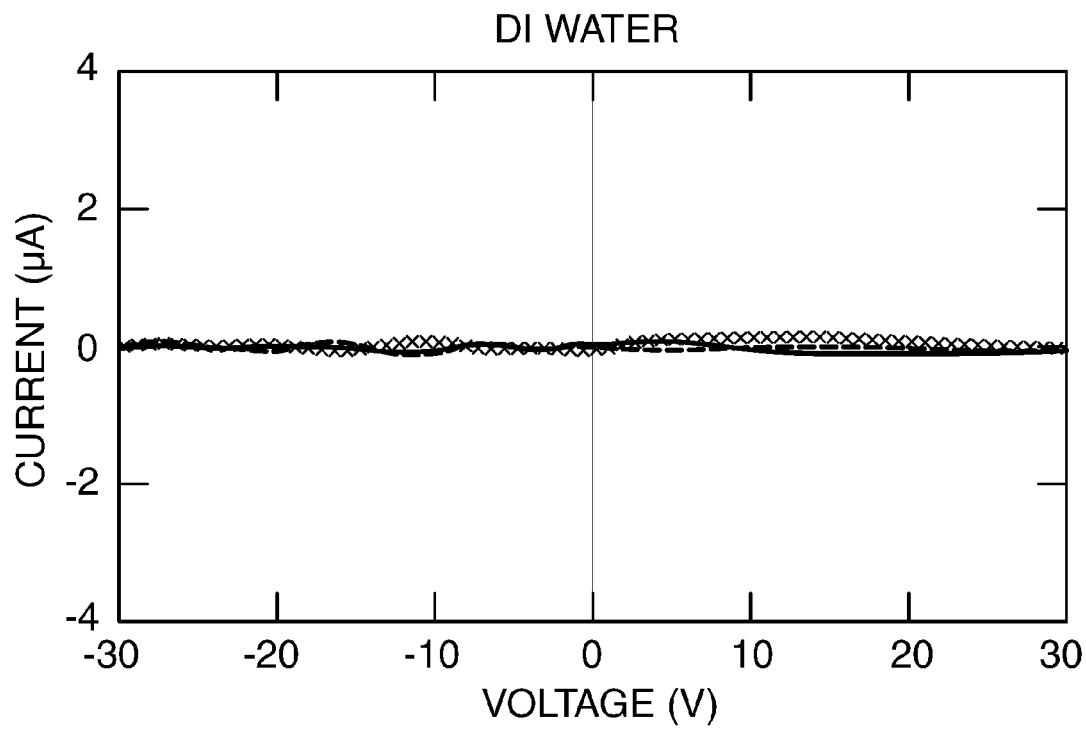
FIGS. 1A-E are graphs illustrating dielectric breakdown test results with current as a function of voltage for various aqueous solutions on a fluoropolymer/$Al_2O_3$ dielectric stack.

The present invention is directed to colored fluids for electrowetting or electrofluidic devices. Electrowetting devices are typically composed of hydrophobic dielectrics and electrodes, and may include other hydrophilic surfaces. In general, the substrates and connected features are exposed to a polar fluid and a non-polar fluid, which are not miscible or emulsifiable with each other. The polar fluids can contain colorants and can have attributes of specified electrical conductivity, as well as desirable viscosity, freezing point, and boiling point characteristics, and also reduce or eliminate performance-damaging ions that can exhibit a negative impact on dielectric substrate and other components of the devices.

In accordance with embodiments of the present invention, the colored conductive fluid can generally include at least one polar solvent, at least one colorant, which may be a pigment and/or a dye, and optionally an agent for controlling the electrical conductivity of the fluid, a dispersant, a synergist, a surfactant, a resin, a polymer, a biocide, other additives known in the art, or any combination thereof. The polar solvent has (a) a dynamic viscosity of 0.1 cP to 1000 cP at 25° C., (b) a surface tension of 25 dynes/cm to 90 dynes/cm at 25° C., and (c) an electrowetting relative response of 20% to 80%. The colored conductive fluid defines a colored fluid that is polar. In one example, the colored conductive fluid is devoid of a non-polar solvent. The colored conductive fluid can include an electrical conductivity from 0.1 µS/cm to 3,000 µS/cm and has no more than 500 total ppm of monatomic ions with ionic radii smaller than 2.0 Å and polyatomic ions with ionic radii smaller than 1.45 Å.

And as more fully explained below, the colored conductive fluid should not cause electrical breakdown of a dielectric, such as at an applied voltage up to three times the theoretical operating voltage of the dielectric. In one example, the colored conductive fluid itself does not cause electrical breakdown of a poly(2-chloro-paraxylylene) dielectric having a thickness of 400 nm at an applied voltage up to 15V and/or does not cause electrical breakdown of an alumina dielectric having a thickness of 100 mu at an applied voltage up to 15V.

The polar solvent of the invention may be an individual solvent or any combination of two or more solvents. Non-limiting examples of the polar solvent include water, glycols, alcohols, polyols, ethers, esters, ketones, acetals, ketals, lactones, carbonates, lactams, urethanes (carbamates), ureas, pyrrolidines, pyrrolidones, sulfones, sulfoxides, amides, primary, secondary, tertiary, or quaternary amines, imines, nitriles, carboxylic acids, aldehydes, halogenated, thio, or nitro compounds, and any mixtures thereof. In one example, the polar solvent is water, a carbonate, a lactone, or a glycol. The polar solvent also can contain one, two or multiple identical or various described functional groups in their molecule that can be of an aliphatic, aromatic, alicyclic, and/or heterocyclic nature.

In one example, the polar solvent can be described by one or more of the following formulas:

(1)

(2)

(3)

(4)

(5)

(6)

(7)

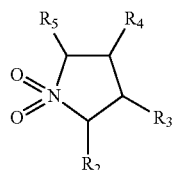

(8)

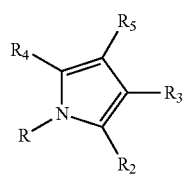

(9)

wherein R and $R_1$ independently are H, a $C_1$-$C_{12}$ Alkyl (Alk), or $(RR_1O)_nH$; $R_2$, $R_3$, $R_4$, and $R_5$ independently are H, $C_1$-$C_{12}$ Alk, halogen, OH, OAlk, SAlk, COOR, =O, $CH_3C$=O, CN, $NRR_1$, $COO(RR_1O)_nR$, $O(RR_1O)_nH$, or $NRR_1(RR_1O)_nH$; and n=1-50.

Non-limiting specific examples of polar solvents are water, methanol, ethanol, isopropanol, n-propanol, 1,2-propylene glycol, 1,3-propylene glycol, 1,4-butylene glycol, diethylene glycol, dipropylene glycol, ethylene carbonate, propylene carbonate, 1,2-butylene carbonate, 1,2-cyclohexane carbonate, glycerine carbonate, dimethyl carbonate, diethyl carbonate, acetone, acetophenone, pyridine, dimethyl malonate, diacetone alcohol, hydroxypropyl carbamate, beta-hydroxyethyl carbamate, formamide, N-methyl formamide, dimethylformamide, N-methyl acetamide, dimethylacetamide, dimethylsulfoxide, sulfolane, 2-pyrrolidone, N-methyl-2-pyrrolidone, N-cyclohexyl-2-pyrrolidone, acetonyl acetone, cyclohexanone, ethyl acetoacetate, ethyl-L-lactate, pyrrole, N-methyl pyrrole, N-ethyl pyrrole, 4H-pyran-4-one, 1,3-dimethyl-2-imidazolidinone, morpholine, N-methylmorpholine, N-ethylmorpholine, N-formylmorpholine, beta-propiolactone, beta-valerolactone, beta-hexalactone, gamma-butyrolactone, gamma-valerorolactone, gamma-hexalactone, gamma-heptalactone, gamma-octalactone, gamma-nonalactone, gamma-decalactone, delta-valerolactone, delta-hexalactone, delta-heptalactone, delta-octalactone, delta-nonalactone, delta-decalactone, delta-tetradecalactone, delta-octadecolactone, and any combination thereof.

The selected polar solvents may also exhibit a dielectric constant equal to or greater than 10 at 25° C. In another example, the dielectric constant is equal to or greater than 25 at 25° C. The polar solvents should also have a surface tension of 25 dynes/cm to 90 dynes/cm at 25° C.

The dynamic viscosity of the polar solvent should be less than 1000 cP at 25° C. In another example, the dynamic viscosity is from 0,1 cP to 1000 cP at 25° C. In yet another example, the dynamic viscosity is from 0.1 cP to 100 cP at 25° C.

The polar solvent also should demonstrate an electrowetting relative response (EWRR) to direct or alternating current of 30V in the range of 20-80%. EWRR is defined here according to the following formula:

$$EWRR = (\Theta_0 - \Theta_V) \times 100 / \Theta_0, \%$$

wherein $\Theta_0$ is the initial contact angle at a voltage of 0V; $\Theta_V$ is the final contact angle at a voltage of 30V. A suitable procedure for measurement of contact angles is described in Balaji Raj et al., "Ion and Liquid Dependent Dielectric Failure in Electrowetting Systems", Langmuir|3b2|ver. 9|13/8/09, the contents of which is incorporated by reference herein in its entirety, and is further discussed in detail below under test procedures.

The pigment that is included in the colored conductive fluid having the polar solvent can be any organic pigment including, but not limited to, an azo, a metal complex, benzimidazolone, azomethine, methine, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, or pyranthrone pigments. Non-limiting specific examples of the organic pigments are C.I. Pigment Black 1, 2, 3, 31, and 32; C.I. Pigment Green 7, 36, 37, 47, 54, and 58; C.I. Pigment Blue 15:1, 15:2, 15:3, 15:4, 15:6, 16, 21, 22, 60, 64, 65, 75, and 76; C.I. Pigment Violet 19, 23, 29, 31, 33, and 37; C.I. Pigment Red 122, 123, 144, 149, 166, 168, 170, 171, 175, 176, 178, 179, 180, 183, 189, 190, 192, 196, 202, 208, 209, 214, 216, 220, 221, 224, 226, 242, 248, 254, 255, 260, 264, and 271; C.I. Pigment Orange 36, 40, 43, 51, 60, 61, 62, 64, 66, 69, 71, 72, 73, and 77; C.I, Pigment Yellow 24, 74, 83, 93, 94, 95, 108, 109, 110, 120, 123, 138, 139, 150, 151, 154, 155, 167, 170, 171, 173, 174, 175, 180, 181, 185, 192, 193, 194, 199, 213, and 218. In one example, the organic pigment is selected from C.I. Pigment Black 1, 31, and 32; C.I. Pigment Green 7, 36, 37; C.I. Pigment Blue 15:1, 15:2, 15:3, 15:4, 15:6, 16, 60, and 64; C.I. Pigment Violet 19, 23, and 29; C.I. Pigment Red 122, 144, 175, 176, 178, 183, 202, 208, 209, 254, 255, 264, and 271; C.I. Pigment Orange 36, 64, 71, 72, and 73; or C.I. Pigment Yellow 74, 83, 110, 120, 138, 139, 150, 151, 154, 155, 175, 180, 181, 185, and 213.

The pigment that is included in the colored conductive fluid also may be any inorganic pigment, such as carbon black, metal oxide, mixed metal oxide, sulfide, or sulfate. Non-limiting specific examples include titanium dioxide, zinc oxide, iron oxide, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, bismuth vanadate, and derivatives and any combinations thereof. Non-limiting specific examples of inorganic pigments are C.I. Pigment Black 6, 7, 9, 11, 12, 14, 15, 22, 26, 27, 28, 29, 30, 33, 34 and 35; C.I. Pigment Green 18, 20, 21, and 22; C.I. Pigment Blue 27, 30, and 73; C.I. Pigment Red 265 and 275; C.I. Pigment Yellow 38, 40, 53, 119, 157, 158, 160, 161, 162, and 184; C.I. Pigment White 4, 5, 6, 6:1, 7, 8, 9, 10, 12, 13, 14, 15, 18, 18:1, 19, 21, 22, 23, 24, 25, 26, 27, 28, 32, 33, and 36. In one example, the inorganic pigment is selected from C.I. Pigment Black 6, 7, 9, 11, 12, 14, 15, 22, 26, 27, 28, 29, 30, 33, 34, and 35 or Cl. Pigment White 4, 5, 6, 6:1, 7, 18, 18:1, 26, 28 and 32.

The pigment that is included in the colored conductive fluid can also be any known extender, for example oxide, carbonate, sulfate, sulfide, or phosphate, and can be synthetic or mineral. Non-limited examples of usable extenders include calcium carbonate, barium sulfate, mica, kaolin, clay, silica, and the like.

The pigment can also be any mixture, complex, or solid solution of two or more organic, inorganic pigments, and extenders.

The pigment that is included in the colored conductive fluid may also be a dispersed particulate material that is non-soluble in the application media. The dispersed particulate material may be a low molecular weight compound, oligomer, polymer, co-polymer, grafted co-polymer, cross-linked polymer, cured polymer, polymer containing polar anionic or cationic groups in the form of insoluble salts with organic and/or inorganic cations and/or anions, or with other polymers or oligomers with opposite charged groups. The pigment can also be any mixture, solid solution, or product of additional intermolecular reaction or coordination of said low molecular weight compounds, oligomers, and polymers. Non-limiting examples of the aforementioned pigments include melamine or alkylene bis-melamine, vinyl polymer and co-polymers, for example, polyalkylene (polyethylene, polypropylene, polybutylene, polyisobutylene, polyisoprene), polystyrene, polyacrylate (polymethacrylates, polyalkyl/aryl acrylate and methacrylate), polyacrylonitrile, polyvinyl halogenide (polyvinyl chloride, polyvinyl fluoride, polyvinyl bromine), polyvinylidene halogenides, polyvinyl alcohols, polyvinyl acetate, polyvinylpyrrolidone, polyvinyl butyral, polyvinyl naphthalene, polyvinyl carbazole, polyamide, polyimide, polyester, polyether, polycarbonate, polyester carbonate, polyacetal, polyurethane, polyurea, polysulfone, poly(ether sulfone), poly(arylene/alkylene) sulfide, polyepoxide, polyaldehyde, polyketone, polyether ether ketone, phenol-formaldehyde, melamine-formaldehyde, urea-formaldehyde, polyethylene terephthalate, polytrimethylene terephthalate, polybutylene terephthalate, hydrocarbon resins, inorganic polymer such as polysiloxanes. The dispersed particulate material may be white or colored with dyes or/and pigments.

The pigment that is included in the colored conductive fluid can also be an encapsulated organic pigment, inorganic pigment, extender, or dye. Encapsulation may be done by any method known in the art, including, for example, physical adsorption and/or precipitation of resin, oligomer, or polymer on pigment surface, coacervation, or polymerization of monomers or oligomers in the presence of pigment particles with or without cross-linking or curing. Polymerization can be realized through any known mechanism of polymerization, such as chain polymerization, condensative chain polymerization, polycondensation, and polyaddition (Pure & App/.Chem., Vol. 66, No. 12, pp. 2483-2486, 1994). Non-limiting examples of pre-made polymers or polymers synthesized from monomers in the presence of pigment particles that can be used for encapsulation are vinyl polymers and co-polymers, such as polyalkylene (polyethylene, polypropylene, polybutylene, polyisobutylene, polyisoprene), polystyrene, polyacrylate (polymethacrylates, polyalkyl/aryl acrylate and methacrylate), polyacrylonitrile, polyvinyl halogenide (polyvinyl chloride, polyvinyl fluoride, polyvinyl bromine), polyvinylidene halogenides, polyvinyl alcohols, polyvinyl acetate, polyvinylpyrrolidone, polyvinyl butyral, polyvinyl naphthalene, polyvinyl carbazole, polyimide, polyimide, polyester, polyether, polycarbonate, polyester carbonate, polyacetal, polyurethane, polyurea, polysulfone, poly(ether sulfone), poly(arylene/alkylene) sulfide, polyepoxide, polyaldehyde, polyketone, polyether ether ketone, phenol-formaldehyde, melamine-formaldehyde, urea-formaldehyde, polyethylene terephthalate, polytrimethylene terephthalate, polybutylene terephthalate, hydrocarbon resins, or inorganic polymers such as polysiloxanes. The polymer for encapsulation can be any natural or synthetic linear, branched, block, random, comb, grafted, dendritic polymer or co-polymer. In addition, one or more natural or synthetic resins can be used for encapsulation, including, but not limited to, rosin, modified rosin, rosin condensates with maleic anhydride and other unsaturated compounds, gums, alkyds, acrylates and its condensates with maleic anhydride, melamine aldehyde, phenol aldehyde, urea aldehyde, epoxy, polyurethane, acetal, phenolics. Encapsulation can include any combination of polymer, oligomer, and resin.

The pigment that is included in the colored conductive fluid also can include a surface modified pigment, such as made by method of chemical modification by covalently attaching (grafting) ionic, nonionic, oligomeric, or polymeric groups to the pigment surface. Non-limiting examples of modifying groups are carboxy, sulfo, arylcarboxy, arylsulfo, phosphate, hydroxy, primary, secondary, tertiary, and quaternary amines, heterocyclic amines, diamines, triamines, polyamines, nitrile, polyalkylene, polyalkyleneoxides, polyester-groups, and any combinations thereof. This group includes self-dispersed pigments. With self-dispersed pigments, the colored conductive fluid can be devoid of a dispersant, for example. In one example, the colored conductive fluid consists of a polar solvent and a self-dispersed pigment.

The pigment may also be a shell type product with inorganic nuclei and organic shell and vice versa.

The dye that is included in the colored conductive fluid having the polar solvent can be any conventional dye including, for example, direct, acid, basic (cationic), reactive, vat, sulfur, solvent, food, mordant, fluorescent, natural, and disperse dye, or any combination thereof. It can be also a complex of any anionic dye with any cationic dye.

The dye that is included in the colored conductive fluid also can include a chromophore such as an azo or azo condensed, a metal complex, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazones, dioxazines, triphenodioxazines, phenazines, thiazines, oxazones, indamines, nitroso, nitro, quinones such as hydroquinones and anthraquinones; rhodamines, phthalocyanines, neutrocyanines, diazahemicyanines, porphirines, perinones, perylenes, pyronins, diketopyrrolopyrroles, indigo, indigoids, thioindigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones, or any combination thereof.

The dye may also be utilized as a colorant, a shader, for pigment surface modification to disperse and stabilize pigment particles in the fluid, for improvement of rheological properties, and/or for adjustment of interfacial tension and conductivity of the fluid.

The agent that can be included in the colored conductive fluid may be selected from compounds that demonstrate an ability to increase the electrical conductivity of the polar fluid, without undesirable impact on dielectric substrate and other components of the device. A majority of pure solvents including ultra pure water, propylene glycol, and propylene carbonate exhibit very low or no detectable conductivity and cannot be used for electro wetting. For purposes herein, substances with some ability for ion dissociation, such as salts, are desirable as agents for electrical conductivity control. In one example, the agent defines a cation and an anion. With respect to ion size, the agents for controlling electrical conductivity do not appreciably dissociate into monatomic anions or cations smaller than 2.0 Å and polyatomic ions smaller than 1.45 Å, which can lead to dielectric break-down at relatively low voltages. Ionic radii are calculated as described in G. S. Manku, "Theoretical Principles of Inorganic Chemistry", 1980, p. 96-105, Tata McGraw-Hill Co, Limited, the contents of which is incorporated by reference herein in its entirety.

An individual compound or any combination of two or more compounds of the following general formulas are desirable agents:

(1) 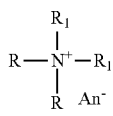

(2) 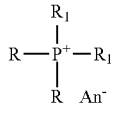

(3) 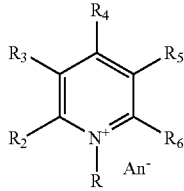

(4) 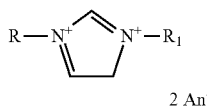

(5) 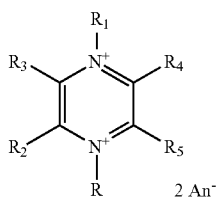

(6) 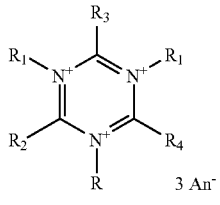

(7) 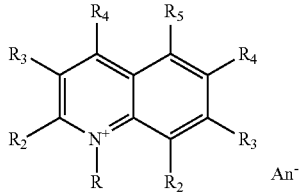

(8) 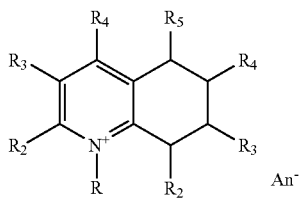

(9) 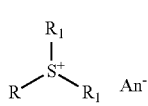

(10) 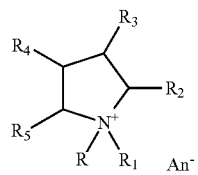

(11) 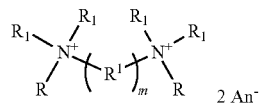

wherein R is H, Alkyl (Alk), Aryl (Ar), or AlkylAryl; $R_1$ is H, Alkyl, Aryl, AlkylAryl, or polyalkylene glycol with molecular weight from 100 to 5,000; $R_2$, $R_3$, $R_4$, and $R_5$ are independently H, Alkyl, Aryl, AlkylAryl, halogen, —$NRR_1$, —OH, —OAlk, —OAr, —SAlk, —SAr, —COOH, —COOAlk, —COOAr, —CONRAlk, —CONRAr, =O, —$CH_3C$=O, —CN, —$SO_3M$, —$SO_2NHR_1$, —$SO_2NHAr$, or —$NO_2$; $R^1$ is a single bond, Alkyl, Aryl, AlkylAryl, polyalkylene glycol with molecular weight from 100 to 5000, polyethyleneimine with molecular weight from 70 to 5000, C=O, C=NH, or C=S; and m is 0-200.

Alkyl may be a $C_1$-$C_{18}$ linear or branched aliphatic hydrocarbon or a $C_3$-$C_{10}$ alicyclic hydrocarbon, or heterocycle including one or multiple atoms of O, N or S, and can be unsubstituted or contain a halogen, such as fluorine, a primary, secondary, tertiary, or quaternary amine, —OH, —OR, —COOM, —$COOR_1$, —$CONRR_1$, =O, —$(CH_3)C$=O, —CN, —$SO_3M$, —$NO_2$ groups, or any combination thereof. Aryl may be a $C_4$-$C_{10}$ aromatic hydrocarbon or aromatic heterocycle including one or multiple atoms of O, N or S, and can be unsubstituted or contain halogen, a primary, secondary, tertiary, or quaternary amine, —OH, —OR, —COOM, —$COOR_1$, —$CONRR_1$, =O, —$(CH3)C$=O, —CN, —$SO_3M$, —$NO_2$ groups, or and any combination thereof. AlkylAryl is a combination of the above described Alkyl and Aryl groups. M is H, a metal, or an organic cation.

In addition to the cations described by Formulas 1-11 above, the cations of the following compounds and their derivatives may be used as the cation of the agent: 2-pyrroline, 3-pyrroline, pyrrole, pyrazolidine, imidazolidine, 2-pyrazoline, 2-imidazoline, pyrazole, imidazoline-2-thione, 1,2,3-thiazole, 1,2,4-thiazole, 1H-tetrazole, oxazoline, 5-oxazolone, isoxazole, oxazole, 2-thiazoline, isothiazole, thiazole, 1,2,3-oxadiazole, 1,2,4-oxadiazole, 1,2,5-oxadiazole, 1,3,4-oxadiazole, 1,3,4-thadiazole, 1,2,4-dooxazole, piperidine, 1-H-pyridine-2-one, piperazine, pyridizine, 1,2,3-triazine, 1,2,4-triazine, oxazine, thiomorpholine, oxadiazine, oxathiazine, indoline, indole, carbazole, indazole, benzimidazole, quinoxaline, phthalazine, 1,5-naphthyridine, phenazine, benzothiazole, 2H-1,4-benzoxazine, phenoxazine, and phenothiazine.

The cation also may be any known basic dye or pigment derivative containing cationic groups. Such cationic dyes can belong, for example, to the class of azo, azomethine, xanthene, azine, thiazine, oxazine, triarylmethane, methine, polymethine, anthraquinone, arylaminoquinone, phthalocyanine, ketone imine, acridine, cyanine, quinacridone, perylene, metal complex, benzimidazolone, diketopyrrolopyrrole, indigo, thioindigo, dioxazine, isoindoline, isoindolinone, iminoisoindoline, irninoisoindolinone, flavanthrone, indanthrone, anthrapyrimidine, quinophthalone, isoviolanthrone, pyranthrone, or nitro. Non-limiting specific examples of cationic dyes are C.I. Basic Yellow 1, 2, 3, 5, 6, 7, 9, 11, 12, 13, 15, 20, 21, 23, 24, 25, 28, 29, 37, 49, 57, 90, and 106; C.I. Basic Orange 1, 2, 4, 5, 6, 7, 8, 9, 10, 11, 14, 15, 16, 17, 18, 19, 21, 22, 23, 24, 30, 33, and 69; C.I. Basic Red 1, 2, 3, 4, 5, 6, 8, 9, 10, 11, 12, 13, 14, 22, 24, 29, 30, 31, 39, 46, 76, 111, and 118; C.I. Basic Violet 1, 2, 3, 4, 5, 6, 7, 8, 9, 10, 11, 12, 13, 14, 16, 18, 21, and 23; C.I. Basic Blue 1, 2, 3, 5, 6, 7, 8, 9, 10, 11, 12, 13, 14, 15, 16, 17, 18, 20, 22, 23, 24, 25, 26, 41, 44, 47, 54, 55, 57, 64, 65, 66, 67, 72, 74, 81, 99, 140, and 162; C.I. Basic Green 1, 4, 3, and 5; C.I. Basic Brown 1, 2, 4, 5, 15, 16, 17, and 18; C.I. Basic Black 1, 2, 3, and 7.

An$^-$ can be a simple (individual) or complex anion, including anions with organic and inorganic components, or any mixture of anions such as, but not limited to, $HSO_4^-$; $SO_4^{2-}$; $HSO_3^-$; $FSO_3^-$; $SO_3^{2-}$; $S_2O_3^{2-}$; $S_2O_4^{2-}$; $S_2O_6^{2-}$; $S_2O_8^{2-}$; $S_2O_7^{2-}$; Alk-OSO$_3^-$; Ar-OSO$_3^-$; ArAlk-OSO$_3^-$; Alk-SO$_3^-$; $CH_3O-(RO)_n-OSO_3^-$; Ar—SO$_3^-$; ArAlk-SO$_3^-$; $NH_2SO_3^-$; P—(X—SO$_3^-$)$_n$; Q-(X—SO$_3^-$)$_n$; N$^-$(SO$_2$CF$_3$)$_2$; N$^-$(SO$_2$CF$_2$CF$_3$)$_2$; N(CN)$_2^-$; NH$_2^-$; Alk-(COO$^-$)$_n$; Ar—(COO$^-$)$_n$; ArAlk-(COO$^-$)$_n$; P—(X—COO$^-$)$_n$; Q-(X—COO$^-$)$_n$; $H_2PO_4^-$; $HPO_4^{2-}$; $H_2PO_2^-$; $PO_4^{3-}$; $P_2O_7^{4-}$; $P_3O_9^{3-}$; $P_3O_{10}^{5-}$; $P_4O_{13}^{2-}$; (AlkO)$_2$POO$^-$; P—(X—POO)$^-_n$; Q-(X—POO)$^-_n$; $NO_3^-$; $NO_2^-$; OCN$^-$; NCO$^-$; SCN$^-$; CNS$^-$; $CS_2^{2-}$; $CS_2^{2-}$; $N_3^-$; $CrO_4^{2-}$; $Cr_2O_7^{2-}CrO_8^{3-}$; $MnO_4^-$; $SiO_3^{2-}$; $TiO_3^{2-}$; $MoO_4^-$; $ReO_4^-$; $WO_4^-$; $ClO_2^-$; $ClO_3^-$; $ClO_4^-$; BrO$^-$; $BrO_2^-$; $BrO_3^-$; $BrO_4^-$; I$^-$; IO$^-$; $IO_2^-$; $IO_3^-$; $IO_4^-$; [Co(CN)$_6$]$^{3-}$; [Fe(CN)$_6$]$^{3-}$; [Fe(CN)$_6$]$^{4-}$; [Cr(CN)$_6$]$^{3-}$; [Cu(CN)$_6$]$^{3-}$; [Ni(CN)$_6$]$^{2-}$; $B_4O_7^{2-}$; $BO_3^{3-}$; B(Ar)$_4^-$; $H_2SbO_4^-$; Sb(OH)$_6^-$; $Sb_2O_7^{4-}$; $HCO_3^-$; $CO_3^{2-}$; $SeO_4^{2-}$, $SeO_4^{2-}$; and SeCN$^-$.

P is a substituted or unsubstituted alicyclic or aromatic hydrocarbon $C_{10}$-$C_{60}$, a substituted or unsubstituted alicyclic or aromatic heterocycle $C_{10}$-$C_{60}$ containing one or multiple atoms of O, N or S. Non-limiting example include naphthalene, methylnaphthalene, decalin, tetralin, anthracene, anthraquinone, naphthaquinone, pyrene, perylene, indoline, indole, quinaline, carbazole, acridine, benzofuran, dibenzofuran, benzopyran, dibenzothiophene, benzoxazine, phenothiazine, and the like. Q is a chromophore belonging to the class of azo, metal complex, benzimidazolone, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, pyranthrone, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones and anthraquinones; rhodamines, neutrocyanines, diazahemicyanines, porphirines, pyronins, indigoids, indophenols, naphthalimides, and combinations thereof. Q can also represent a residue of an acid, direct, reactive, vat, disperse, sulfur, or solvent dye. X is a simple bond, an Alk, Ar, or AlkAr (as defined above), and n=1-6.

In addition, other known ionic fluids not described by Formulas 1-11 and mentioned above can be used as a conductivity controlling agent.

Specific non-limiting examples of the agent includes, for example, tetrabutylammonium iodide, N-methylpyridinium dodecylsulfate, tetramethylphosphonium acetate, 1-Ethyl-3methylimidazolium dicyanamide triethylsulfonium iodide, dodecyltrimethylammonium octanesulfonate, 2-sulfoanthraquinone tetrabutylphosphonium, copper phthalocyanine sulfonic acid trimethyldodecylammonium, and tetrabutyl ammonium salt of C.I. Acid Violet 43, Desirable attributes of the selected agents for conductivity control are ion size and complexity, the ion stability to various factors, and the absence of undesirable foreign inorganic and organic ions.

Examples of unsuitable compounds are salts containing monatomic ions excluding iodine, protic acids, aprotic acids such as Lewis acids, and bases. For example, it has been demonstrated in aqueous media that some ions, such as hexafluorophosphate and tetrafluoroborate anions will decompose, resulting in the formation of HF, a noxious and aggressive acid, and naturally F$^-$ and $H_3O^+$ small ions (Sigma-Aldrich ChemFiles, Ionic Liquids, Vol. 5, #6, p. 3). Undesirable ions are monatomic ions with ionic radii smaller than 2.0 Å or polyatomic ions with ionic radii smaller than 1.45 Å, Polyatomic ions that can decompose to produce monatomic ions with ionic radii smaller than 2.0 Å and new polyatomic ions smaller than 1.45 Å are also undesirable. Non-limiting examples of undesirable monatomic ions are Li$^+$; Na$^+$; K$^+$; Rb$^+$; Mg$^{2+}$; Ca$^{2+}$; F; Cl$^-$; Br$^-$ and the like. Non-limiting examples of undesirable polyatomic ions are $H_3O^+$; OH$^-$; $PF_6^-$; $BF_4^-$; $AlCl_4^-$; $MnCl_4^-$; $NiCl_4^-$; $InCl_4^-$; $RuCl_4^-$; $TiF_6^-$; $FeCl_3^-$; $SiF_6^-$; and the like.

With respect to impurities, the agents for electrical conductivity control should have purity greater than 95%. In another example, the purity is greater than 99.0%, and in yet another example, the purity is greater than 99.5%. The purity is defined here as the degree to which a substance is undiluted or unmixed with extraneous material, typically expressed as a percentage.

The agent for conductivity control does not contain more than 500 ppm total amount of monatomic ions with ionic radii smaller than 2.0 Å and polyatomic ions with ionic radii smaller than 1.45 Å, which may be present due to traces of starting materials for synthesis, contamination, or as a result of chemical, thermal, electro-chemical, photo-chemical, or any other degradation resulting in some amounts of smaller ions. This requirement can be accomplished using known purification techniques. Non-limiting methods of purification include re-crystallization, sublimation, chromatographical separation, extraction, ion exchange, ultrafiltration, osmosis, reverse osmosis, or any combination thereof. A higher content of small ions may result in degradation of device operability, or breakdown of dielectric substrates.

Agents for electrical conductivity control should also be stable against chemical, thermal, photo-chemical, electro-chemical, or any other type of degradation. The agents for electrical conductivity control also should be sufficiently soluble in the selected solvent for the colored conductive polar fluid. The solubility should be at least 0.1 mMol/L for efficient conductivity adjustment. In addition, the agents should not have any significant effect on the stability of the colored fluid, such as undesirable interactions with colorants having ionic groups. And interactions with other components of the colored fluid such as ionic surfactants, polymers, and resins should not negatively affect performance of the fluid or the device.

Agents for electrical conductivity control that can absorb light in the visual part of the electromagnetic spectrum and demonstrate acceptable light fastness may also function as a colorant, synergist, and/or dispersant for the colored fluid in addition to adjusting conductivity.

Other components of the colored conductive fluid, such as solvents, co-solvents, colorants, surfactants, dispersants, synergists, and other additives, may contribute to electrical conductivity of the fluid. In these cases, the agent for electrical conductivity control may be used at a reduced level or not used at all. These components should not contribute any ion species that would result in the fluid containing more than 500 ppm total amount of monatomic ions with ionic radii smaller than 2.0 Å and polyatomic ions with ionic radii smaller than 1.45 Å. This requirement can be accomplished through purification of said components using any appropriate technique. Again, non-limiting methods of purification include distillation, re-crystallization, centrifugation, sublimation, chromatographical separation, extraction, ion exchange, ultrafiltration, osmosis, reverse osmosis, or any combination thereof.

The surfactant that can be included in the colored conductive fluid can be an anionic, cationic, catanionic, zwitterionic (amphoteric), non-ionic, or any combinations thereof. In one example, the surfactant is non-ionic or catanionic. Non-limiting examples include sulfonates, phosphonates, polyethylene oxides, polypropylene oxides, polybutylene oxides containing any functional groups, and block and random co-polymers thereof; alkyl, aryl, and alkylaryl amines such as primary, secondary, tertiary, and quaternary amines and polyamines; pyrrolidones, naphthalene condensates, alkynes, carboxylic acids, alcohols, polyols, and any combinations thereof. The surfactant can be synthetic or natural. The surfactant may be used for colloid stabilization of pigment particles in fluid, to lower interfacial tension and thereby decrease the voltage required to cause electrowetting, and/or to increase conductivity of the fluid.

The synergist that can be included in the colored conductive fluid can be, for example, sulfonic acid, metal salt of sulfonic acid, salt of sulfonic acid with primary, secondary, tertiary, and quaternary amines; sulfonamide, phthalimidomethyl, arylmethyl, alkyl amines, carboxylic acids, salts, amides and esters of carboxylic acids; carbonyl, amidomethyl, alkylaminomethyl, arylalkyloxy, phenylthio and phenylamino derivatives of azo, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, and pyranthrone, or any combination thereof. The synergist can also be a derivative of any direct, acid, basic (cationic), reactive, vat, sulfur, solvent, food, mordant, natural, and disperse dye, or any combination thereof. It can be also a complex of any anionic dye with any cationic dye. The synergist may be used for pigment surface modification to stabilize pigment particles in the fluid, to improve rheological properties, and/or to adjust conductivity of the fluid.

The dispersant that can be included in the colored conductive fluid can be selected from the following classes: anionic, cationic, zwitterionic (amphoteric), and non-ionic polymers or oligomers that are block, random, comb, grafted, dendritic polymers or co-polymers selected from the group of polyalkylene oxides such as polyethylene oxide, polypropylene oxide, or polybutylene oxide; polyamide, polyester, polyacrylate, polyethylenimine, polyether amine, polyvinyl alcohol, polyvinylacetate, polyvinylpyrrolidone, polyvinyloxazolidone, polyvinylmethyloxazolidone, polystyrene, polyepoxide, polyurethane, polyurea, or polyvinyl halogen. The dispersants can be used individually or in combination with other dispersants, surfactants, and synergists. In one embodiment, the dispersant is a non-ionic dispersant.

The resin that can be included in the colored conductive fluid can include a natural or synthetic resin, such as rosin and modified rosin, rosin condensates with maleic anhydride and other unsaturated compounds, gums, alkyds, acrylates, melamine aldehyde, phenol aldehyde, urea aldehyde, epoxy, polyurethane, acetal, phenolics, or any combination thereof.

The polymer that can be included in the colored conductive fluid can include a natural or synthetic linear, branched, block, random, comb, grafted, dendritic polymer or co-polymer selected from polyalkylene oxides, such as polyethylene oxide, polypropylene oxide, or polybutylene oxide; polyamide, polyester, polyacrylate, polyethylenimine, polyether amine, polyvinylalcohol, polyvinylacetate, polyvinylpyrrolidone, polyvinyloxazolidone, polyvinylmethyloxazolidone, polystyrene, polyepoxide, polyurethane, polyurea, polyvinyl halogen, or any combination thereof. The polymer can contain one or multiple groups including sulfo-, sulfamido-, carboxy-, carboxamido-, urea-, thiourea-, urethane-, azo-, keto-, oxy-, oxyalkyl-, thio-, amino-, aminoalkyl-, phosphato-, monohalotriazolo-, dihalotriazolo-, vinyl sulfono-, phenylamino sulfono-, alkyl, polyalkyl, alkylene glycol, alkylaryl, halogen, alkyl and/or aryl halogen, or any combination thereof.

In one embodiment, the colored conductive fluid includes a polar solvent, a self-dispersed pigment and/or a dye, and is devoid of at least a surfactant, a dispersant, a polymer, and a resin. In another embodiment, the colored conductive fluid can include at least one organic or inorganic pigment stabilized in a polar fluid with a surfactant, a synergist, a polymer, or a dispersant.

The colored fluids including the polar solvent may further include other additives, such as those described in PCT/US2008/076168, filed Sep. 12, 2008, and entitled "Electrofluidic Devices, Visual Displays, and Methods for Making and Operating Such Electrofluidic Devices", the contents of which is incorporated by reference herein in its entirety. Biocides and defoamers may also be added.

The polar solvent may be in the range of from about 50.0 wt % to 99.9 wt %, based on the total weight of the colored fluid. In another example, the polar solvent may be in the range of from about 80.0 wt % to 99 wt %.

The pigment content of the colored conductive fluid may be in the range from about 0 wt % to about 50 wt %, based on the total weight of the colored fluid. In one example, the pigment content is in the range from about 0.1 wt % to about 50 wt %, based on the total weight of the colored fluid. In another example, the pigment content is in the range from about 1 wt % to about 20 wt %, based on the total weight of the colored fluid. Pigment concentrations below 0.1 wt % will usually not provide the desired color intensity, and above 50 wt % will not electrowet effectively. The colored conductive fluid may include dye from 0 wt % up to about 50 wt % based on the total weight of the colored fluid. In another example, dye content of the colored conductive fluid may be in the range from about 0.1% by weight to about 50% by weight based on the total weight of the colored fluid.

The agent content of the colored conductive fluid for electrical conductivity control may be in the range from about 0 wt % to about 10 wt %, based on the total weight of the colored fluid. In another example, the agent content of the colored conductive fluid may be in the range from about 0.01% by weight to about 10% by weight based on the total weight of the colored fluid. In yet another example, the agent content of the colored conductive fluid may be in the range from about 0.1% by weight to about 10% by weight based on the total weight of the colored fluid.

The colored conductive fluid also can include from 0 wt % up to about 200 wt % dispersant by weight of the pigment in the fluid. In another example, the colored conductive fluid can include from 0.1 wt % up to about 80 wt % dispersant by weight of the pigment in the fluid. The colored conductive fluid also can include from 0 wt % up to about 30 wt % synergist by weight of the pigment. In another example, the colored conductive fluid can include from 0.1 wt % to 30 wt % synergist by weight of the pigment.

The colored conductive fluid also can include from 0 wt % up to about 200 wt % surfactant, resin, and/or polymer by weight of the pigment in the fluid. In another example, the colored conductive fluid can include from 0 wt % to 10 wt % surfactant. In another example, the colored conductive fluid can include from 0.1 wt % up to about 10 wt % surfactant. In another example, the colored conductive fluid can include from 0 wt % to 80 wt % resin and/or polymer by weight of the pigment. In another example, the colored conductive fluid can include from 0.1 wt % up to about 80 wt % resin and/or polymer. In addition, the colored conductive fluid also can include from 0 wt % to 5 wt % defoamer and/or biocide, by weight of the colorant. In yet another example, the colored conductive fluid can include from 0.1 wt % to 5 wt % defoamer and/or biocide, by weight of the colorant.

The colored fluid may have an electrical conductivity no greater than 3000 µS/cm. In another example, the colored fluid may have an electrical conductivity in a range from about 0.1 µS/cm to 3000 µS/cm. In another example, the colored conductive fluid has an electrical conductivity from about 5 µS/cm up to 3000 µS/cm. In yet another example, the colored conductive fluid has an electrical conductivity of about 5 µS/cm up to about 500 µS/cm. In still another example, the colored conductive fluid has an electrical conductivity from about 10 µS/cm up to about 300 µS/cm. If conductivity is too low, a higher voltage has to be applied for proper device function. If conductivity is too high, the probability of dielectric breakdown is increased.

In addition, the colored conductive fluid should have a surface tension of 15 dynes/cm to 90 dynes/cm at 25° C. In another example, the surface tension is 25 dynes/cm to 55 dynes/cm at 25° C.

The dynamic viscosity of the colored conductive fluid should be less than 1000 cP at 25° C. In another example, the dynamic viscosity is from 0.1 cP to 500 cP at 25° C. In still another example, the dynamic viscosity is from 0.5 cP to 100 cP at 25° C.

The EWRR of the colored conductive fluid is in the range of 10-80%, In another example, the range is 40-80%.

The colored conductive fluid also has no greater than 500 ppm total ion content of monatomic ions with ionic radii smaller than 2.0 Å and polyatomic ions with ionic radii smaller than 1.45 Å. In another example, the colored conductive fluid has no greater than 300 ppm total ion content of monatomic ions with ionic radii smaller than 2.0 Å and polyatomic ions with ionic radii smaller than 1.45 Å. In yet another example, the colored conductive fluid has no greater than 100 ppm total ion content of monatomic ions with ionic radii smaller than 2.0 Å and polyatomic ions with ionic radii smaller than 1.45 Å. In still another example, the colored conductive fluid has from 1 ppm to 500 ppm total ion content of monatomic ions with ionic radii smaller than 2.0 Å and polyatomic ions with ionic radii smaller than 1.45 Å.

In addition, in one embodiment, the colored conductive fluid does not cause electrical breakdown of a dielectric. In one example, the colored conductive fluid itself does not cause electrical breakdown of a poly(2-chloro-paraxylylene) dielectric having a thickness of 400 nm at an applied voltage up to 15V. In another example, the colored conductive fluid itself does not cause electrical breakdown of a poly(2-chloro-paraxylylene) dielectric having a thickness of 400 nm at an applied voltage up to 30V. In still another example, the colored conductive fluid itself does not cause electrical breakdown of a poly(2-chloro-paraxylylene) dielectric having a thickness of 400 nm at an applied voltage up to 50V. In another example, the colored conductive fluid does not cause electrical breakdown of an alumina dielectric having a thickness of 100 nm at an applied voltage up to 15V. In another example, the colored conductive fluid does not cause electrical breakdown of an alumina dielectric having a thickness of 100 nm at an applied voltage up to 30V. In still another example, the colored conductive fluid does not cause electrical breakdown of an alumina dielectric having a thickness of 100 nm at an applied voltage up to 50V.

In another embodiment, a plurality of colored fluids is combined together. For example, a colored conductive fluid having the polar solvent and the pigment and/or dye may be combined with a colored fluid having a non-polar solvent and a pigment and/or dye, with each including additional optional components as discussed above with respect to the colored fluid having the polar solvent. Non-polar colored fluids can include, for instance, aliphatic, alicyclic, aromatic, or heterocyclic compounds, silicone or germanium oils, fatty alcohols and carboxylic acids and their ethers and esters, or mixtures thereof. The non-polar colored fluid may contain a colorant, such as a pigment or a dye.

The colored fluids having the non-polar solvent should not be miscible with the colored fluids having the polar solvent, and should not form a stable emulsion therewith. To that end, the non-polar solvent should have a cross-solubility level with the polar solvent that is less than about 10%. In one example, the cross-solubility is less than about 1%. In addition, components of the polar electrowetting fluid should not migrate into the non-polar electrowetting fluid or vice versa. The interfacial tension between the polar electrowetting fluid and the non-polar electrowetting fluid may be about 2 to about 55 dynes/cm. In another example, the interfacial tension between the polar electrowetting fluid and the non-polar electrowetting fluid may be about 5 to about 55 dynes/cm. If the non-polar solvent is a gas, the interfacial tension with the polar electrowetting fluid can be about 10 dynes/cm to about 55 dynes/cm. In another example, if the non-polar solvent is a gas, the interfacial tension polar electrowetting fluid can be about 15 dynes/cm to about 55 dynes/cm. If interfacial tension is too low, mixing of the polar electrowetting fluid and non-polar electrowetting fluid will occur, and if too high, higher voltages will be required for electrowetting response.

The pigment particles that are included in the colored fluids can have a mean weight diameter ranging from about 10 nm to 5000 nm, based on dynamic light scattering particle size analysis. In one example, the mean weight diameter ranges from about 20 nm to 500 nm.

In preparing the colored fluids, the components can be premixed in a vessel equipped with a high-speed stirrer with rotation velocity in a range of 500-12,000 RPM. The mixture may then be milled utilizing known milling equipment, such as but not limited to a rotating ball mill, vibration mill, agitated horizontal or vertical media mill, basket mill, rotor/stator type machines, or attritors. The mixture may be milled by batch operation or by way of recirculation and/or discrete pass. Any known type and size of media can be employed, for example, glass, ceramics, sand, polymeric, and metal media with sizes in a range from 30 µm to about 10 cm. Typical mills include those manufactured by Eiger, Netzsch, Buhler, Premier, Hockmeyer, Chicago Boiler, Drais, Union Process, etc. Alternatively, the colored fluids may be produced on batch process equipment, such as a rotating ball mill or an agitated ball mill. The former is typified by those provided by Paul-O-Abbe; the latter is typified by those supplied by Union Process, Media size for either may range in size as noted above, and media shape may be circular, regular, irregular, or a mixture thereof The colored fluids may also be prepared on any high-energy disperser with a shear mechanism, such as an IKA Works, Baker-Perkins, etc., sigma blade mixer. The colored fluids may optionally be filtered and/or centrifuged to remove large pigment particles, broken media, or contaminants. Other methods of preparation known in the art can also be employed. Various changes and modification may be made in the invention described above without departing from the spirit and scope thereof. All descriptions are for the purpose of illustration only and are not intended to be limiting.

The viscosity of the colored fluids is measured with a Brookfield Viscometer LVDV–II+Pro at T=25° C., rotation speed 30 RPM, and spindle number 18. Particle size distribution is determined using Nanotrac™ 250, NPA 250 (Microtrac, Inc.) and Microtrac™ UPA (Microtrac, Inc.). Interfacial tension for colored fluids is measured using a drop tensiometer IFT Tracker™ (Teclis). The tensiometer uses drop shape analysis to calculate surface tension or interfacial tension where drop shape is determined by the forces of surface tension and gravity acting on the drop. Either a pendant drop or a rising drop configuration is used; the configuration was determined by the specific gravities and optical characteristics of fluids. The dielectric constant is measured at 25° C. using a Scientifica 870 Liquid Dielectric Constant Meter (Princeton Instruments).

EXAMPLES

The following examples illustrate details of the present invention and are not intended to limit the spirit and the scope of the invention. Unless otherwise indicated, % and parts always denote % and parts by weight.

Test procedures.

The electrical conductivity for colored fluids was measured at 25° C. with a conductivity meter capable of measuring the desired range of conductivity, for example VWR model number 23226 or Oakton® Acorn Con 6 model.

As indicated above, colored fluids were tested for electrowetting capability by evaluating change in contact angle on a hydrophobic dielectric and electrode substrate with voltage application. Indium tin oxide (ITO) coated glass was covered with a combination of Parylene C dielectric and Cytonix Fluoropel 1601V hydrophobic fluoropolymer as the ambient. Alternately, the dielectric layer may consist of $Al_2O_3$ and Asahi Cytop CTL-809M hydrophobic fluoropolymer. A conductive wire attached at one point to the ITO layer of the substrate served as the ground electrode. The substrate was submerged in a transparent non-polar solvent and a drop of colored conductive fluid having a polar fluid was placed on the surface. Direct or alternating current in increments of 2V was supplied to the drop through a tungsten cat whisker probe and the contact angle of the drop at each voltage was recorded and calculated using VCA Optima software program (AST Products). A fluid was considered electrowetting capable if the contact angle decreased upon application of voltage so that the final contact angle was less than 90°. See Balaji Raj et al., "Ion and Liquid Dependent Dielectric Failure in Electrowetting Systems", Langmuir|3b2|ver. 9|13/8/09, the contents of which is incorporated by reference herein in its entirety. In addition, colored polar fluids were measured without conductivity adjustment provided fluid conductivity was not less than 25 μS/cm. The EWRR was calculated from the contact angle data using this method.

Colored conductive fluids were also tested for their tendency to cause dielectric failure, referred to here as dielectric breakdown. It is generally understood that dielectric breakdown results from the migration of small ionic species of the colored conductive fluid into and/or through a dielectric layer. The $SnO_2$:$In_2O_3$ coated glass was covered with a thin dielectric layer, which may be alumina, i.e., $Al_2O_3$, with Asahi Cytop fluoropolymer or Parylene C with FluoroPel fluoropolymer. A 1 μL drop of the fluid to be tested was placed on the substrate and a tungsten probe was positioned in the drop. Current was measured while completing direct current (DC) voltage sweeps from −99 V to 99 V. Dielectric failure, i.e., breakdown, was indicated by a current greater than 1 μA or an exponential increase in current, See Balaji Raj et al., "Ion and Liquid Dependent Dielectric Failure in Electrowetting Systems", Langmuir|3b2|ver. 9|13/8/09, the contents of which is incorporated by reference herein in its entirety. Three to five drops were tested for each solution for repeatability. For some examples, the worst result for each solution was presented.

Concerning the alumina dielectric, the $SnO_2$:$In_2O_3$ coated glass was coated with the alumina via atomic layer deposition at 250° C. using manufacturer specified pre-cursors and cycle times for a Cambridge Nanotech Savannah 100 ALD system. In particular, the precursors used were trimethylaluminum (Sigma-Aldrich) and DI water. The precursor pulse time and $N_2$ purge time used were 0.015 s and 8 s, respectively. The $Al_2O_3$ film was then spincoated with 1 wt % solution of Asahi Cytop fluoropolymer. The spin cycle involved a 500 rpm spread for 15 s and 1000 rpm spin for 45 s. The sample was then annealed at 180° C. for 30 min, resulting in a fluoropolymer of about 50 nm thickness.

Concerning the Parylene C dielectric, the $SnO_2$:$In_2O_3$ coated glass was coated with the Parylene C via chemical vapor deposition using manufacturer pre-set deposition parameters for a Specialty Coatings Systems PDS 2010 Lab Coater. Parylene C and Paraylene HT (both available from Specialty Coatings Systems, Inc.) are tradenames for a variety of chemical vapor deposited poly(p-xylylene) polymers, with the precursor generally being [2.2]paracyclophane. The commonly used Parylene C is a poly(2-chloro-paraxylylene) having a monochlorinated aromatic ring ($\epsilon_r$=3.1, $\gamma_d$=38 mN/m). With the less commonly used Parylene HT, fluorine atoms replace all aliphatic hydrogen atoms ($\epsilon_r$=2.2, $\gamma_d$=26 mN/m) (data, Specialty Coating Systems, Inc.). Other variants, for example, include Parylene N and Parylene D that differ from Parylene C by only one chlorine atom.

The theoretical operating voltage for a dielectric can be calculated with the following equation, using an IFT value of 7 dynes/cm, an electrowetting angle of 75 degrees, and a Young's angle of 180 degrees.

$$V_O = \sqrt{\frac{(\cos(\theta_V) - \cos(\theta_Y)) * 2 * \gamma_{NP} * d}{\varepsilon_0 * \varepsilon_r}}$$

where $V_O$ is the operating voltage, $\theta_V$ is the electrowetting angle, $\theta_Y$ is the Young's angle, $\gamma_{NP}$ is the interfacial tension between the polar and non-polar fluids, $\epsilon_0$ is the permittivity constant, $\epsilon_r$ is the relative dielectric permittivity, and d is the thickness of the dielectric.

Ion content was measured by elemental analysis using inductively coupled plasma spectroscopy (ICP), Samples were prepared for metal content by digestion in concentrated nitric acid and then by dilution to 5% acid concentration in deionized water. The sample was then introduced to a Thermo Scientific iCAP 6000 ICP-OES instrument to identify and quantify the total elemental content including non-ionic species of metals, metalloids, and non-metals such as phosphorus, sulfur and selenium. When the content of such elements, including but not limited to sodium, magnesium, calcium, iron, aluminum, and potassium, is determined by ICP, the upper limit of the total element content is established by summation. Ion content as defined here is known to be lower than the elemental analysis, thus establishing the upper limit of the ionic content. In addition, total halogen (bromine, chlorine) content was determined by oxidation. To determine total halogen, the sample was oxidized in a Schöniger Oxidation Flask and the evolved halogen was absorbed into an alkali solution. The halogen was is then precipitated from this solution and determined gravimetrically.

Polyatomic ions can be measured through common analytical techniques specific to the ionic species. These include but are not limited to pH, titrimetric methods, colorimetric methods, spectroscopic methods, gravimetric methods, and/or mass spectrometry.

Example 1

Solutions of potassium chloride (KCl), sodium dodecyl sulfate (SDS), and dodecyltrimethylammonium chloride (DTAC) were prepared at 1% in DI water. A catanionic surfactant dodecyltrimethylammonium octanesulfonate (DTA-OS) was prepared and purified according to the method described in Balaji Raj, Manjeet Dhindsa, Neil R. Smith, Robert Laughlin, and Jason Heikenfeld, "Ion and Liquid Dependent Dielectric Failure in Electrowetting Systems", Langmuir|3b2 |ver. 9|13/8/09), the content of which is incorporated herein by reference. A solution of DTA-OS was prepared at 0.05 wt % in DI water. Electrical conductivity for the solutions is shown in Table 1 below.

TABLE 1

Electrical conductivity results for dielectric breakdown test

| Solution | Conductivity (µS/cm) |
|---|---|
| 1 wt % KCl in DI water | 1002 |
| 1 wt % SDS in DI water | 877 |
| 1 wt % DTAC in DI water | 1330 |
| 0.05 wt % DTA-OS in DI water | 46.5 |

Figure 1B:
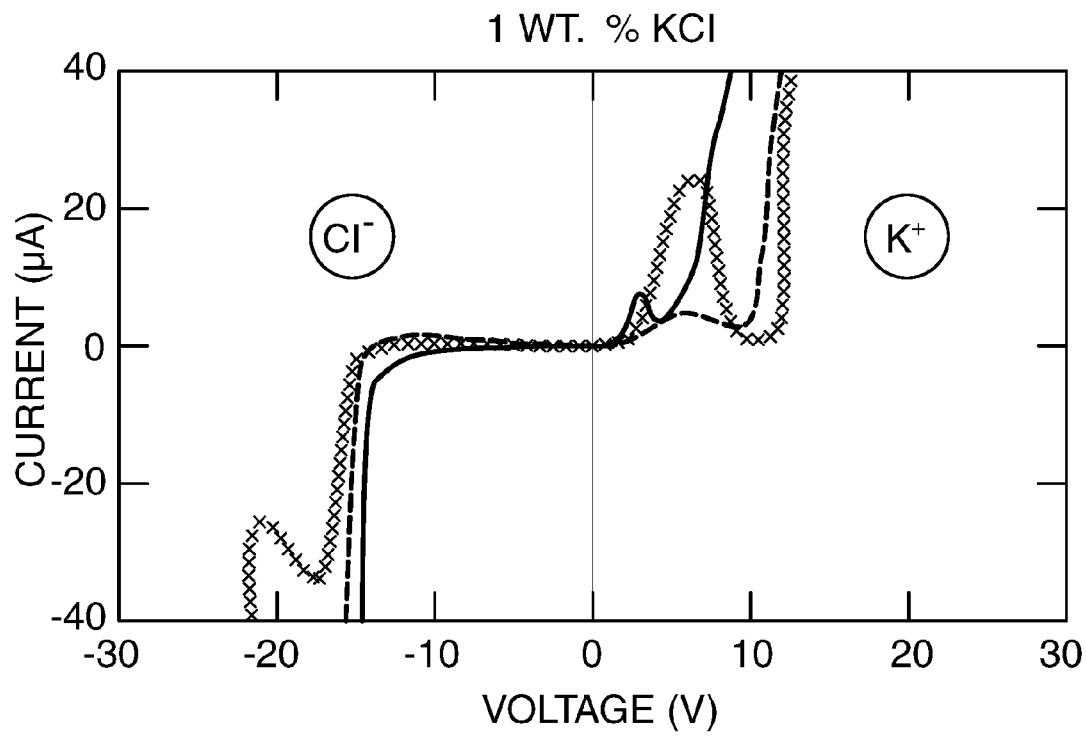
Figure 1C:
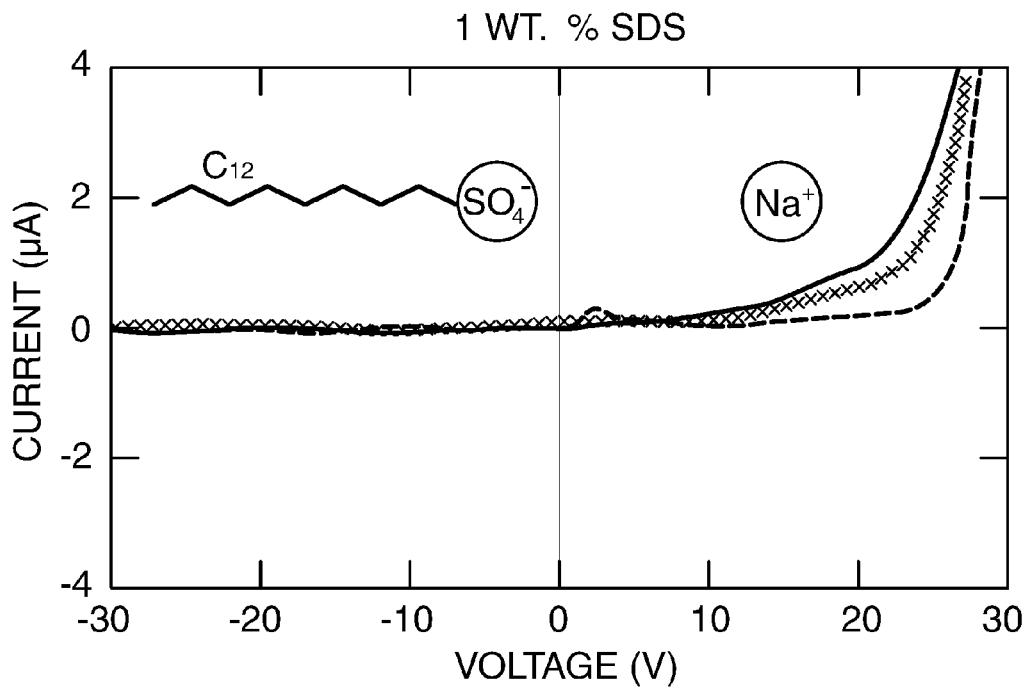
Figure 1D:
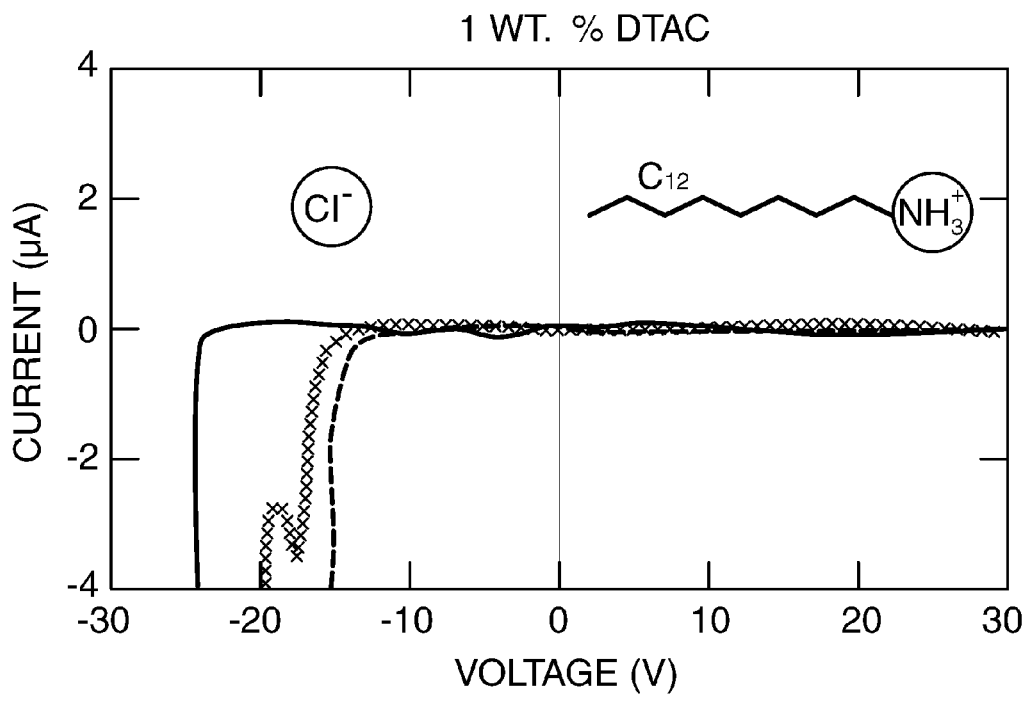
Figure 1E:
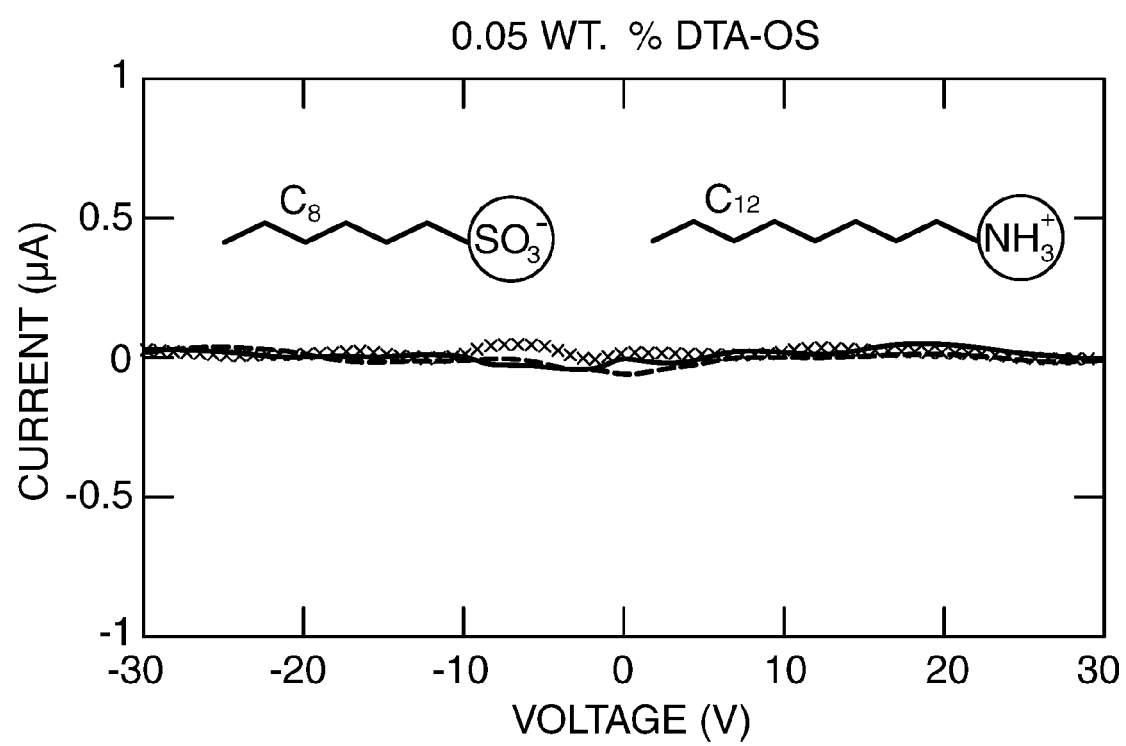

Testing for dielectric breakdown was completed on 100 nm $Al_2O_3$ and 50 nm Cytop substrates according to the procedure described above. Experimental results are presented in FIGS. 1A-E. As shown in FIG. 1A, no breakdown was observed with positive or negative voltage for DI water without any added ion species. In FIG. 1B, dielectric breakdown was observed with positive and negative DC voltage for a solution containing small $K^+$ and $Cl^-$ ions. In FIG. 1C, dielectric breakdown was observed only with positive voltage for a solution containing a small $Na^+$ cation and a large dodecyl sulfate anion. In FIG. 1D, dielectric breakdown was observed only with negative voltage for a solution containing a small $Cl^-$ anion and a large dodecyltrimethylammonium cation. Finally, FIG. 1E illustrates that breakdown does not occur with positive or negative DC voltage for the solution of DTA-OS catanionic surfactant where both the anion and cation are large. These results demonstrate that ion size is a dominant factor in breakdown of the dielectric for electrowetting devices.

Example 2

Figure 2A:
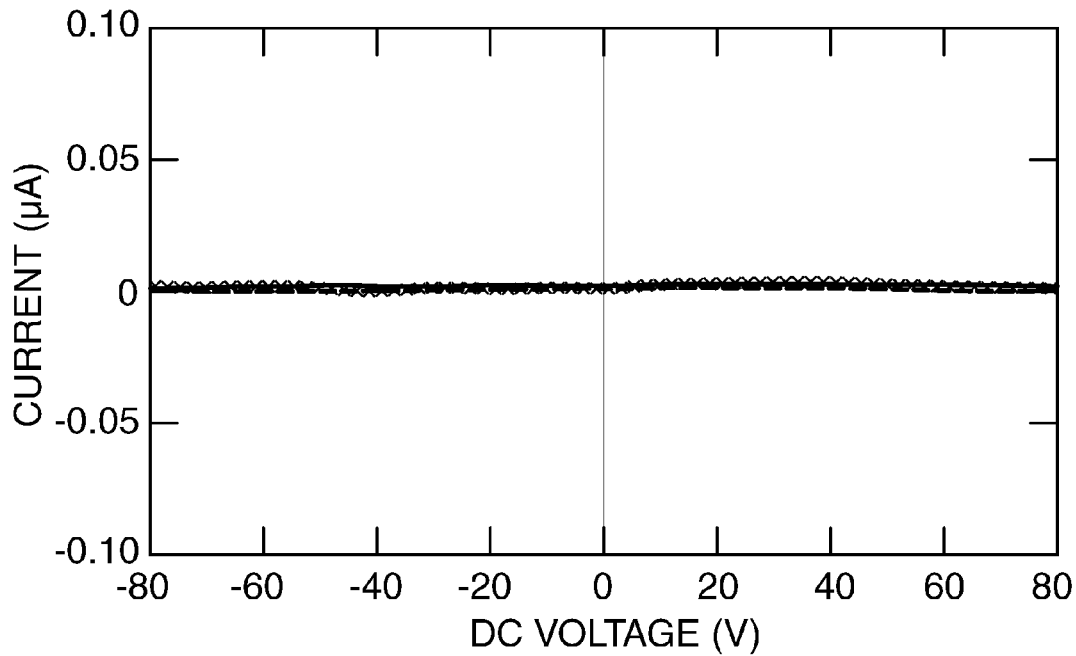
FIGS. 2A-B are graphs illustrating dielectric breakdown test results with current as a function of voltage for 0.013 wt % SDS aqueous solution for (a) 700 nm Parylene C and (b) 300 nm Parylene C.
Figure 2B:
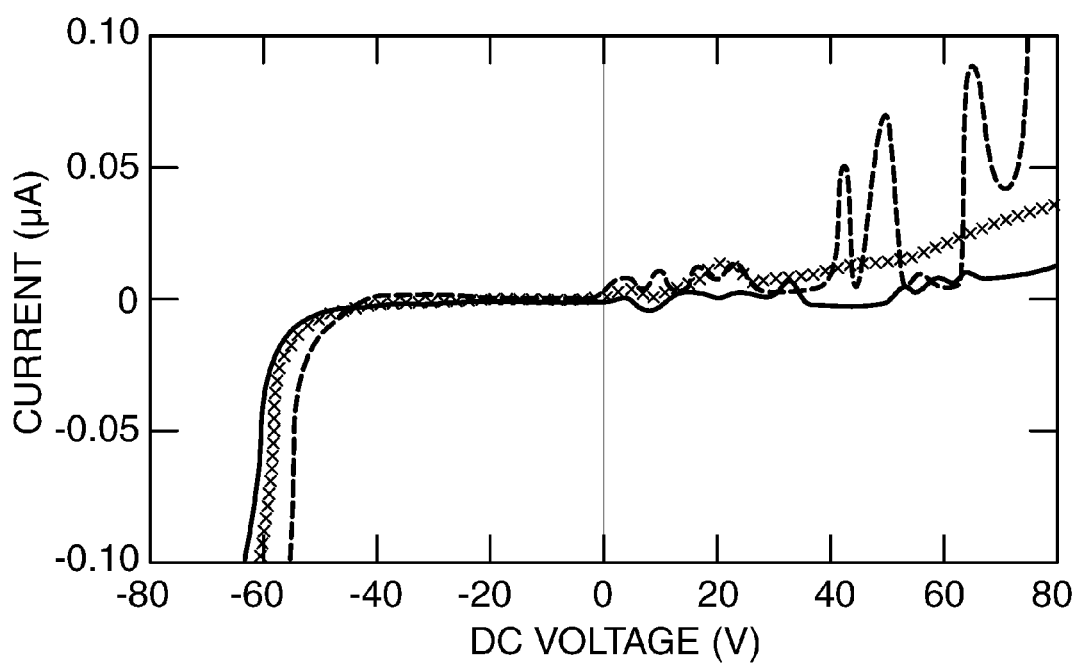

A solution of sodium dodecyl sulfate (SDS) was prepared at 0.013% in DI water. The solution was tested for dielectric breakdown on substrates with different thicknesses of Parylene C—one with 300 nm Parylene C and one with 700 urn Parylene C. As shown in FIGS. 2A and 2B, breakdown with positive DC voltage was observed for the thinner dielectric due to the small $Na^+$ cation. This illustrates the importance of ion selection to allow the use of thin dielectrics in electrowetting devices to operate at low voltages.

Example 3

Figure 3A:
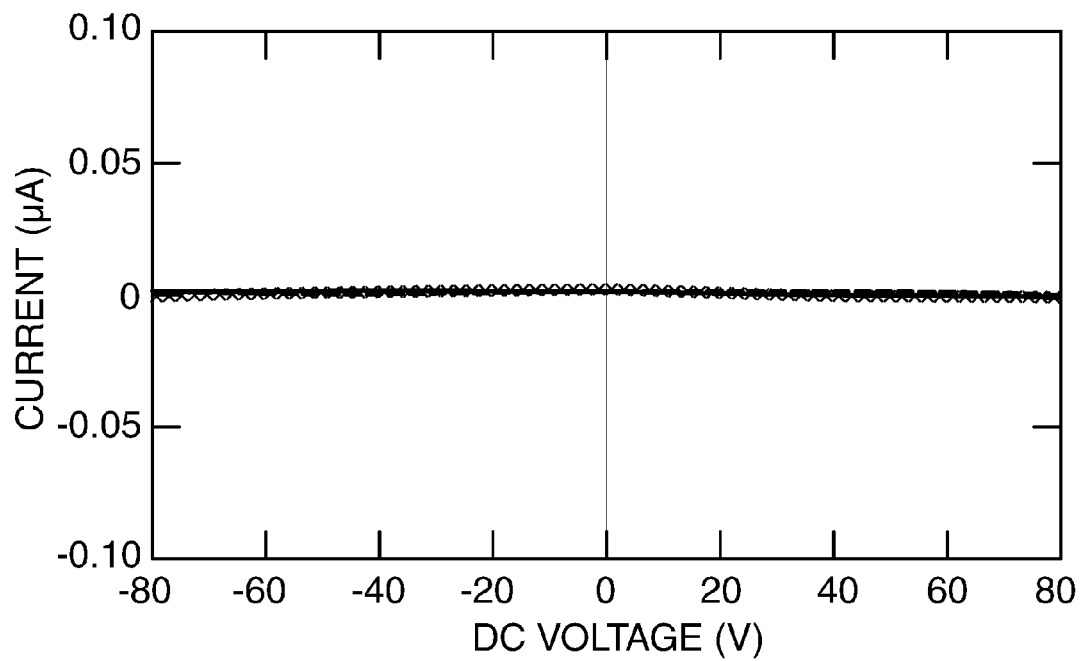
FIGS. 3A-B are graphs illustrating dielectric breakdown test results with current as a function of voltage for (a) 0.013 wt % SDS and (b) 1.00 wt % SDS aqueous solutions on 300 nm Parylene HT.
Figure 3B:
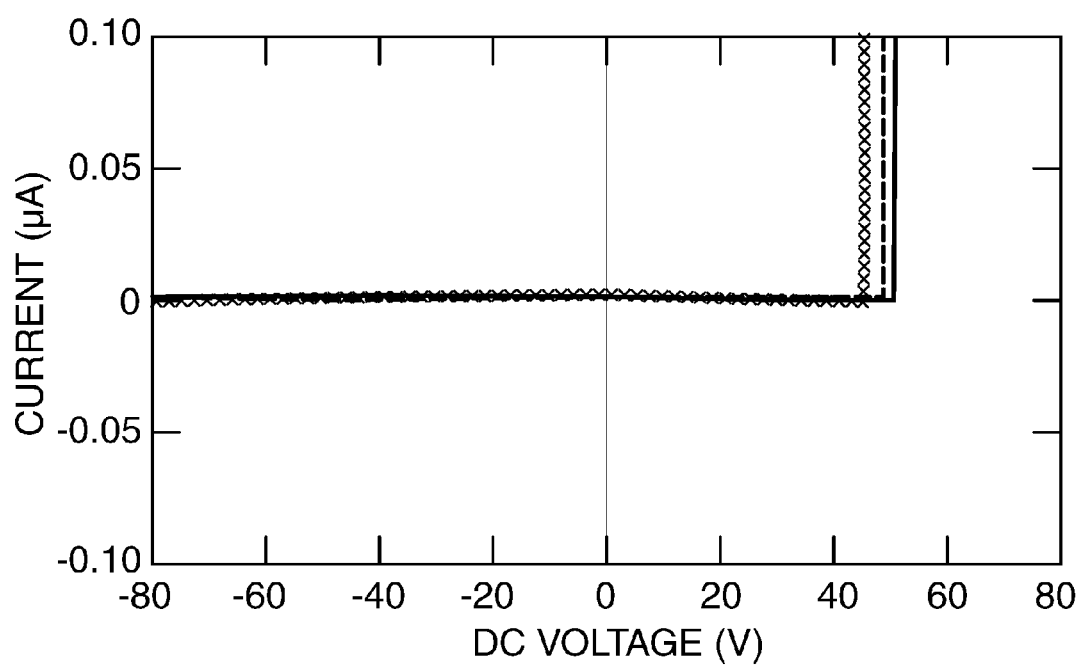

Solutions of sodium dodecyl sulfate (SDS) were prepared at 0.013% and 1% in DI water. The solutions were tested for dielectric breakdown on a substrate with 300 nm Parylene IIT. As shown in FIGS. 3A and 3B, no dielectric breakdown was observed for the solution with a low concentration of SDS while a high concentration resulted in breakdown with positive DC voltage.

Example 4

Salts containing various anions were evaluated in propylene carbonate for dielectric breakdown. Salts were obtained with a purity level of "purum" from Sigma Aldrich and used without further purification. The following salts shown in Table 2 below were dissolved in propylene carbonate to reach conductivity in the range of 20 to 30 µS/cm.

TABLE 2

Salts for dielectric breakdown test/Conductivity results

| Salt | Conductivity (µS/cm) |
|---|---|
| Tetrabutylammonium chloride (TBA-Cl) | 23 |
| Tetrabutylammonium bromide (TBA-Br) | 25 |
| Tetrabutylammonium iodide (TBA-I) | 26 |
| Tetrabutylammonium acetate (TBA acetate) | 26 |
| Tetrabutylammonium hexafluorophosphate | 24 |
| Tetrabutylammonium trifluoromethanesulfonate | 20 |

Figure 4:
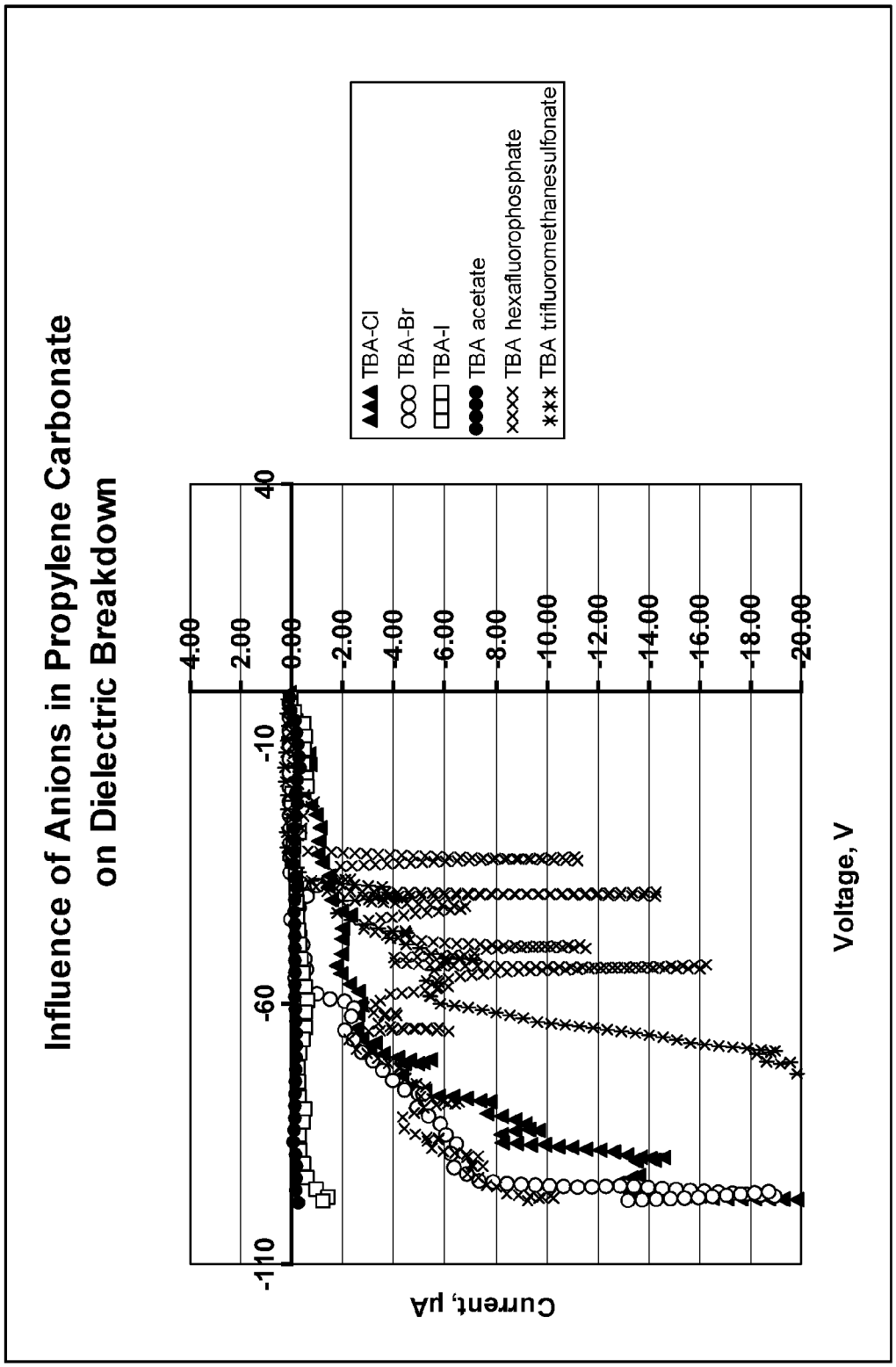
FIG. 4 is a graph illustrating dielectric breakdown test results with current as a function of voltage for anions in propylene carbonate.

Testing for dielectric breakdown was completed on 400 nm Parylene C with 50 nm Fluoropel substrates according to the procedure described above. As shown in FIG. 4, solutions with $I^-$ and acetate anions did not exhibit dielectric breakdown with negative DC voltage. Solutions containing $Cl^-$ and $Br^-$ ions resulted in breakdown of the dielectric, as did solutions with hexafluorophosphate and trifluoromethanesulfonate. The fact that these two large anions resulted in breakdown can be explained by degradation of hexafluorophosphate yielding small $F^-$ anion or impurities in trifluoromethanesulfonate including $F^-$ anion.

Example 5

Fluids were prepared by dispersing C.I. Blue 15:4 in propylene glycol on a Harbil shaker with 2 to 2.5 mm ceramic media for two hours. Fluids were analyzed for the presence of several ion species which could cause dielectric breakdown. The results are presented in Table 3 below. All results are in part per million (ppm).

TABLE 3

Ion species present in blue fluids by elemental analysis

| | Element (ppm) | | | | | | Total |
|---|---|---|---|---|---|---|---|
| | Na | K | Mg | Ca | Fe | Al | Halogen |
| 1258-103-A | 25.8 | <10 | 1.9 | 5.2 | 20.6 | 4.3 | 220 |
| 1258-103-B | 629 | <10 | 4.0 | 21.0 | 10.2 | 5.6 | 236 |
| 1258-103-C | 976 | <10 | 5.9 | 23.1 | 18.7 | 3.3 | 335 |

Figure 5:
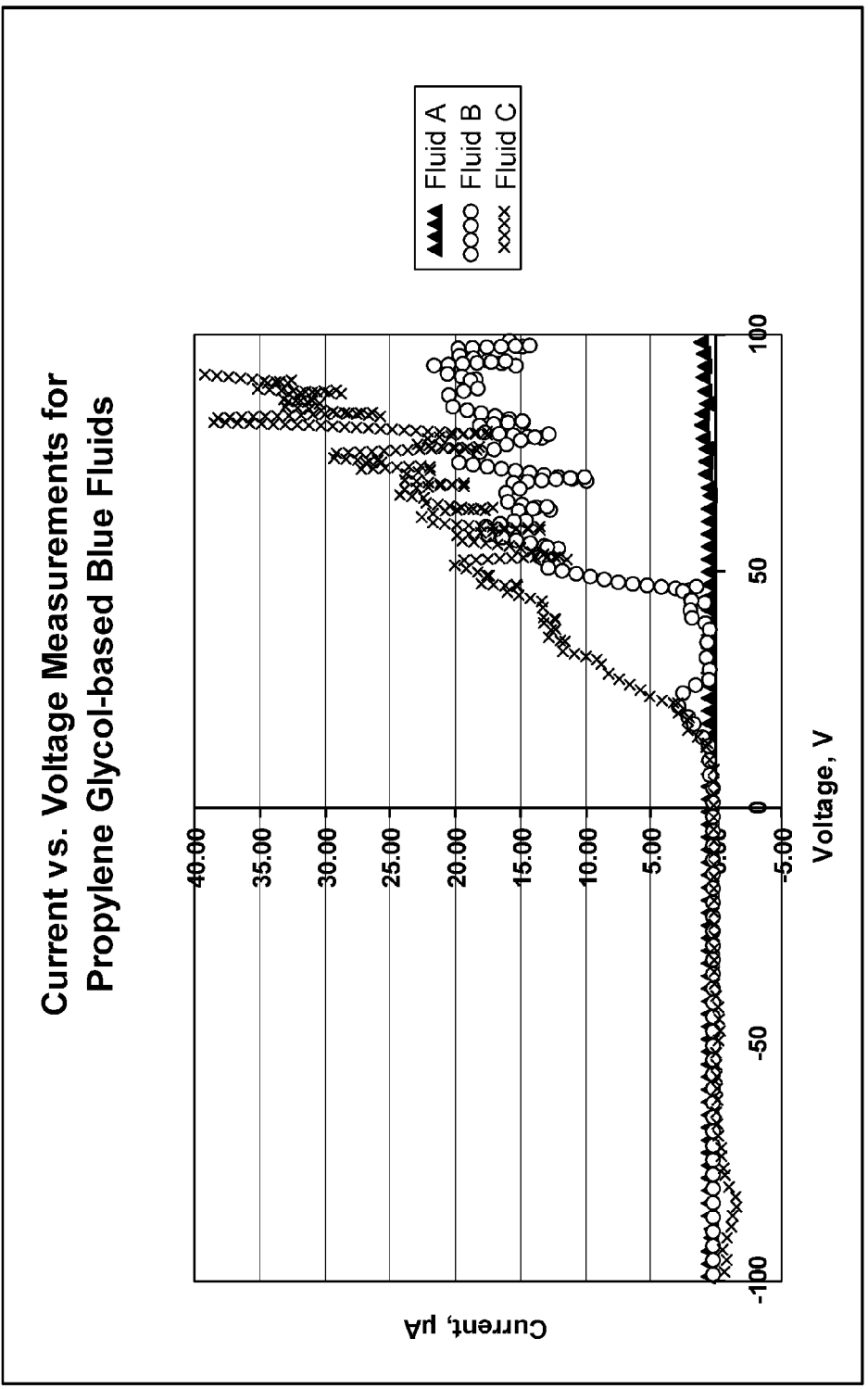
FIG. 5 is a graph illustrating dielectric breakdown test results with current as a function of voltage for propylene glycol-based blue fluids.

The fluids were tested for dielectric breakdown on 400 nm Parylene C with 50 nm Fluoropel substrates. As shown in FIG. 5, blue fluids B and C with high $Na^+$ content exhibited dielectric breakdown with positive DC voltage. Fluid A with low $Na^+$ content did not exhibit dielectric breakdown. Dielectric breakdown was not observed with negative DC voltage for any fluids.

Example 6

Figure 6:
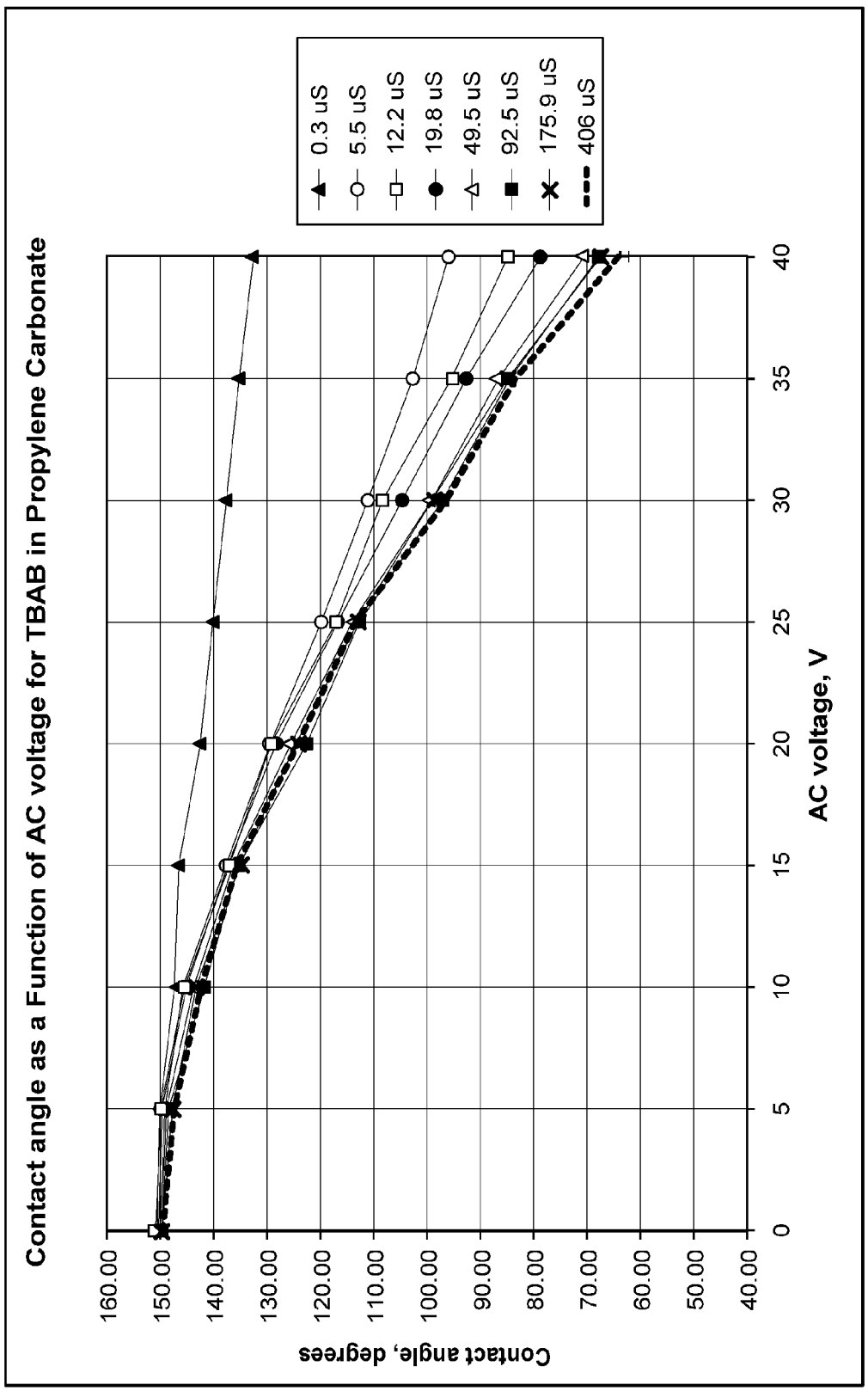
FIG. 6 is a graph illustrating the contact angle as a function of AC voltage for TBAB in propylene carbonate.

Solutions of tetrabutylammonium bromide (TBAB), which was obtained from Sigma Aldrich and used without further purification, were prepared in propylene carbonate to have different conductivities. Contact angle was measured as a function of AC voltage on 1.3 μm Parylene C with 50 nm Fluoropel substrates. As shown in Table 4 below and FIG. 6, EWRR at 30V of propylene carbonate is improved with increased conductivity.

TABLE 4

Calculated EWRR at 30 V of TBAB in propylene carbonate at various conductivity

| Conductivity, μS/cm | EWRR at 30 V |
|---|---|
| 0.3 | 8.54% |
| 5.5 | 25.71% |
| 12.2 | 28.11% |
| 19.8 | 30.45% |
| 49.5 | 34.11% |
| 92.5 | 35.23% |
| 175.9 | 33.96% |
| 406.0 | 35.73% |

Example 7

Salts containing various cations were evaluated in propylene glycol for dielectric breakdown. Salts were obtained with a purity level of "purum" from Sigma Aldrich and used without further purification. The salts shown in Table 5 below were dissolved in propylene glycol to reach conductivity in the range of 20 to 30 μS/cm.

TABLE 5

Conductivity of salt solutions in propylene glycol

| Salt | Conductivity (μS/cm) |
|---|---|
| Sodium Acetate (Na acetate) | 26.6 |
| Ammonium Acetate ($NH_4$ acetate) | 20.5 |
| Tetrabutylammonium Acetate (TBA acetate) | 22.7 |

Figure 7:
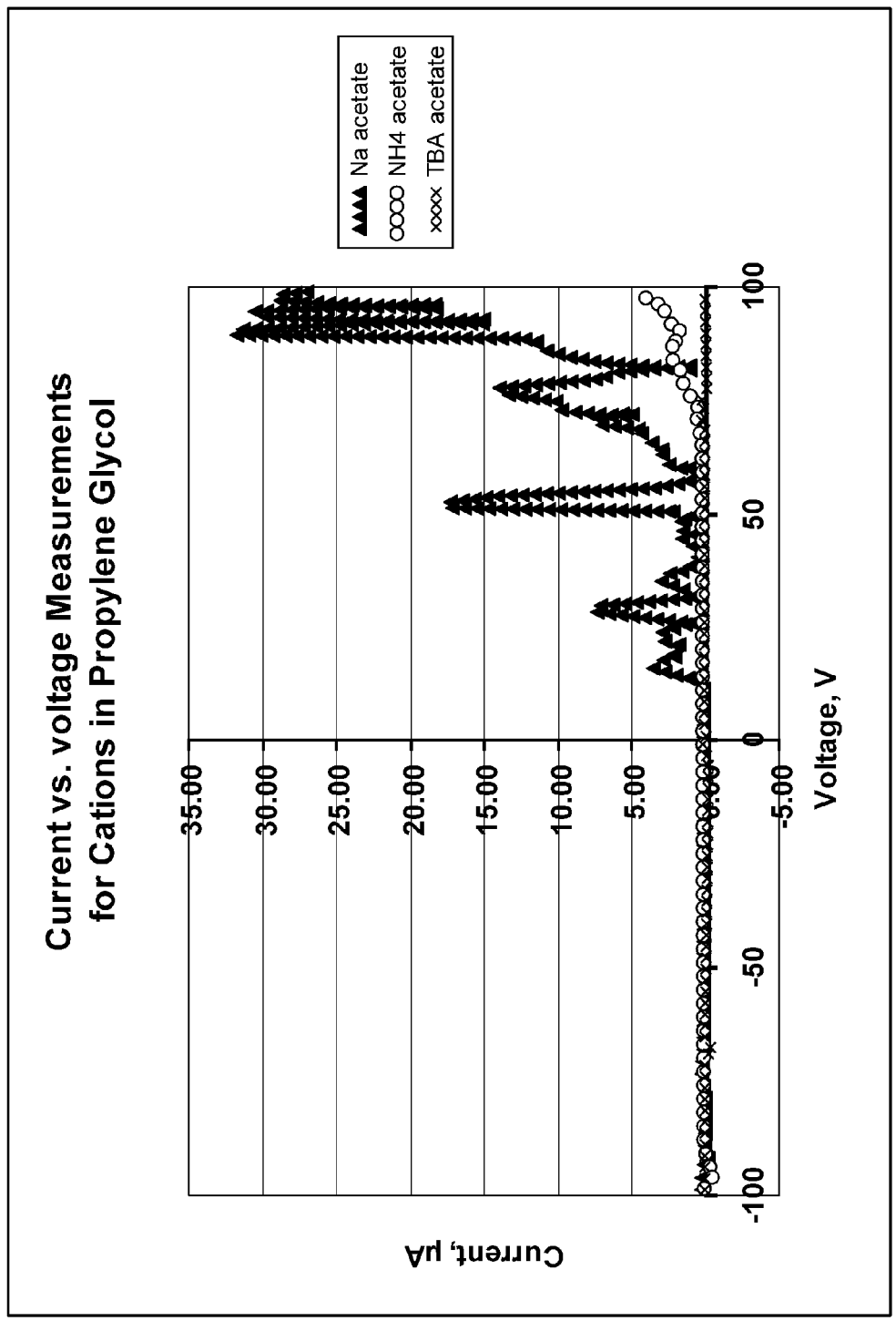
FIG. 7 is a graph illustrating dielectric breakdown test results with current as a function of voltage for cations in propylene glycol.

Testing for dielectric breakdown was completed on 400 nm Parylene C with 50 nm Fluoropel substrates. As shown in FIG. 7, the solution with $Na^+$ resulted in dielectric breakdown. The solutions containing $NH_4^+$ and tetrabutylammonium did not exhibit breakdown.

The various embodiments of the colored fluids of the invention may be used to supply coloration in electronic displays that operate by principles of electrowetting, electrofluidics, and/or electrophoresis, in color filters, in inkjet inks, in liquid toners, and in developers.

In one specific embodiment, the colored fluids of the embodiments of the invention may be used in a display that operates according to electrowetting principles to create an image. Generally, an electrowetting device contains a plurality of individual pixels which are filled with a polar fluid and a non-polar fluid, which are immiscible. A voltage applied to, or removed from, each pixel causes movement of the polar fluid and thereby changes the appearance or state of the pixel from, for example, a colored state to a non-colored or transparent state.

Figure 8A:
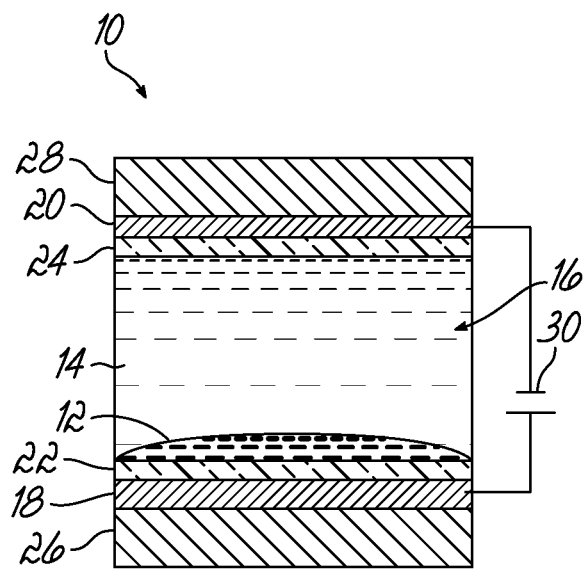
FIG. 8A is a diagrammatic cross-sectional view of an electrowetting device operating as a display pixel in accordance with an embodiment of the invention.
Figure 8B:
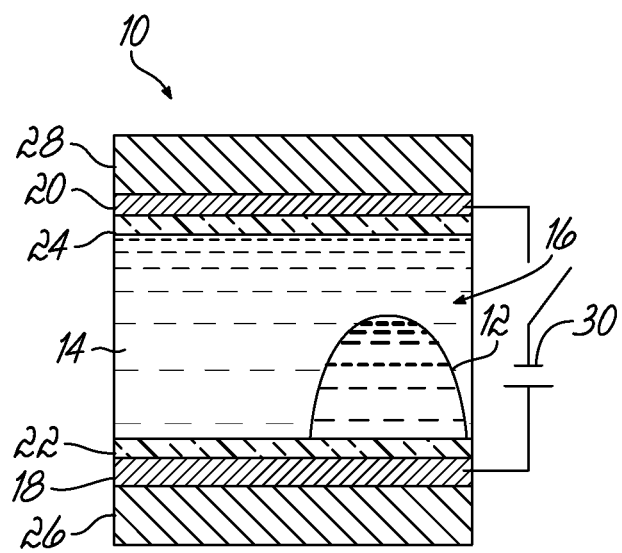
FIG. 8B is a diagrammatic cross-sectional view of the electrowetting device of FIG. 1A in which the display state of the pixel is altered.

A representative pixel 10 for use as an electrowetting device in a display is shown as an embodiment of the invention in FIGS. 8A, 8B. A polar fluid 12 including at least one polar solvent and at least one colorant consistent with one of the embodiments of the invention and a non-polar fluid 14 are confined inside a reservoir 16. The reservoir 16 is disposed between a first electrode 18 and a second electrode 20. Each of the electrodes 18, 20 is coated by a respective hydrophobic coating 22, 24 composed of an insulator, such as a fluoropolymer. The fluids 12, 14, electrodes 18, 20, and coatings 22, 24 in the stacked arrangement are supported by substrates 26, 28. A voltage source 30 is connected between the electrodes 18, 20 and is further connected with a control circuit (not shown) for the pixels of the display so that the pixel 10 can be addressed to change display states.

Light is supplied to the substrate 26 and directed through the stack of fluids 12, 14, electrodes 18, 20, coatings 22, 24, and substrate 28 to the environment exterior to the pixel 10. In the presence of a voltage applied by the voltage source 30 to the electrodes 18, 20 as shown in FIG. 8A, the polar fluid 12 forms a film over the hydrophobic coating 22 such that the pixel 10 has a visual appearance related to the coloration of the film. For example, if the polar fluid 12 is red in color, the light of a red wavelength is observed from the pixel 10. The color of polar fluid 12 is manifested in the light transmitted through the pixel 10 because of the increased surface area of the polar fluid 12 over the area of hydrophobic coating 22. When the potential difference is removed as shown in FIG. 8B, the polar fluid 12 responds by changing its shape and, thereby, its contact angle relative to the surface of the hydrophobic coating 22. The visible coloration of the polar fluid 12 is less apparent in the display state of FIG. 8B because less of the light is transmitted through the polar fluid 12 and, by comparison, more of the light is transmitted through the non-polar fluid 14. The non-polar fluid 14, which lacks the coloration of the polar fluid 12, preferentially wets most of the surface area of the hydrophobic coating 22 when the voltage is absent from the electrodes 18, 20 in FIG. 8B. The non-polar fluid 14 may be non-colored or transparent. These two contrasting display states of the pixel 10 shown in FIGS. 8A, 8B, along with contrasting display states of other pixels (not shown) similar to pixel 10, may be used by the display to generate an image. When the potential difference is re-applied between the electrodes 18, 20 of the pixel 10, the polar film 12 will return from the display state of FIG. 8B to the display state of FIG. 8A.

A person having ordinary skill in the art will appreciate that the pixel 10 may have various alternative constructions and that the construction shown in FIGS. 8A, 8B may vary. In an alternative embodiment, the pixel 10 may be configured such that the applied potential difference causes the polar fluid 12 to form a film as in FIG. 8A and removal of the applied potential difference produces the state of increased contact angle in FIG. 8B. Alternatively, the polar fluid 12 may be moved by the potential difference to a position within the pixel 10 at which the polar fluid 12 is not visible and hidden from an observer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed", "comprised" or variants thereof are used in either the detailed description or the claims, such terms are intended to be inclusive in a manner similar to the term "comprising."

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A colored conductive fluid comprising:
   at least one polar solvent having (a) a dynamic viscosity of 0.1 cP to 1000 cP at 25° C., (b) a surface tension of 25 dynes/cm to 90 dynes/cm at 25° C., and (c) an electrowetting relative response of 20% to 80%, and
   at least one colorant selected from a pigment and/or a dye, wherein the colored conductive fluid has an electrical conductivity from 0.1 μS/cm to 3,000 μS/cm and has no more than 500 total ppm of monatomic ions with ionic radii smaller than 2.0 Å and polyatomic ions with ionic radii smaller than 1.45 Å.

2. The colored conductive fluid of claim 1 further including at least one agent for controlling the electrical conductivity of the colored conductive fluid, the agent including a cation and an anion.

3. The colored conductive fluid of claim 2 wherein the agent for controlling the electrical conductivity of the colored conductive fluid is selected from one or more of the following formulas:

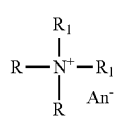 (1)

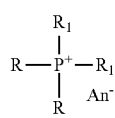 (2)

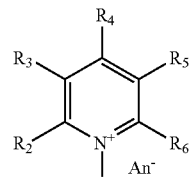 (3)

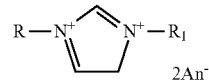 (4)

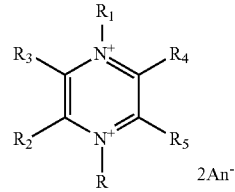 (5)

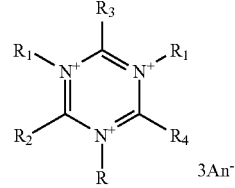 (6)

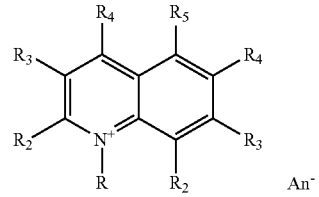 (7)

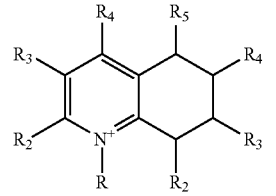 (8)

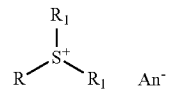 (9)

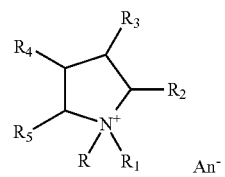 (10)

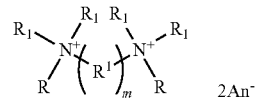 (11)

wherein R is H, Alkyl, Aryl, or AlkylAryl;

$R_1$ is H, Alkyl, Aryl, AlkylAryl, or polyalkylene glycol with molecular weight from 100 to 5,000;

$R_2$, $R_3$, $R_4$, and $R_5$ are independently H, Alkyl, Aryl, AlkylAryl, halogen, —$NRR_1$, —OH, —OAlkyl, —OAryl, —SAlkyl, —SAryl, —COOH, —COOAlkyl, —COOAryl, —CONRAlkyl, —CONRAryl, =O, —$CH_3C$=O, —CN, —$SO_3M$, —$SO_2NHR_1$, —$SO_2NHAryl$, or $NO_2$;

$R^1$ is a single bond, Alkyl, Aryl, AlkylAryl, polyalkylene glycol with molecular weight from 100 to 5000, polyethyleneimine with molecular weight from 70 to 5000; C=O, C=S or C=NH;

Alkyl is a substituted or unsubstituted $C_1$-$C_{18}$ linear or branched aliphatic hydrocarbon, a $C_3$-$C_{10}$ alicyclic hydrocarbon, or a heterocycle including one or multiple atoms of O, N or S;

Aryl is a substituted or unsubstituted $C_4$-$C_{10}$ aromatic hydrocarbon or aromatic heterocycle including one or multiple atoms of O, N or S;

AlkylAryl is a combination of the Alkyl and Aryl groups;

m is 0-200;

M is H, a metal, or an organic cation; and

An is an individual anion, a complex anion, or any mixture thereof.

4. The colored conductive fluid of claim 2 wherein the cation is selected from the group consisting of 2-pyrroline, 3-pyrroline, pyrrole, pyrazolidine, imidazolidine, 2-pyrazoline, 2-imidazoline, pyrazole, imidazoline-2-thione, 1,2,3-thiazole, 1,2,4-thiazole, 1H-tetrazole, oxazoline, 5-oxazolone, isoxazole, oxazole, 2-thiazoline, isothiazole, thiazole, 1,2,3-oxadiazole, 1,2,4-oxadiazole, 1,2,5-oxadiazole, 1,3,4-oxadiazole, 1,3,4-thadiazole, 1,2,4-dooxazole, piperidine, 1-H-pyridine-2-one, piperazine, pyridizine, 1,2,3-triazine, 1,2,4-triazine, oxazine, thiomorpholine, oxadiazine, oxathiazine, indoline, indole, carbazole, indazole, benzimidazole, quinoxaline, phthalazine, 1,5-naphthyridine, phenazine, benzothiazole, 2H-1,4-benzoxazine, phenoxazine, and phenothiazine.

5. The colored conductive fluid of claim 2 wherein the cation is a basic dye or a basic dye or pigment derivative with basic groups selected from the group consisting of an azo, azomethine, xanthene, azine, thiazine, oxazine triarylmethane, methine, polymethine, anthraquinone, arylaminoquinone, phthalocyanine, ketone imine, acridine, cyanine, quinacridone, perylene, metal complex, benzimidazolone, diketopyrrolopyrrole, indigo, thioindigo, dioxazine, isoindoline, isoindolinone, iminoisoindoline, iminoisoindolinone, flavanthrone, indanthrone, anthrapyrimidine, quinophthalone, isoviolanthrone, pyranthrone, and nitro.

6. The colored conductive fluid of claim 2 wherein the anion is selected from the group consisting of $HSO_4^-$; $SO_4^{2-}$; $HSO_3^-$; $FSO_3^-$; $SO_3^{2-}$; $S_2O_3^{2-}$; $S_2O_4^{2-}$; $S_2O_6^{2-}$; $S_2O_8^{2-}$; $S_2O_7^{2-}$; Alk-$OSO_3^-$; Ar—$OSO_3^-$; ArAlk-$OSO_3^-$; Alk-$SO_3^-$; $CH_3O$-(RO)$_n$-$OSO_3^-$; Ar—$SO_3^-$; ArAlk-$SO_3^-$; $NH_2SO_3^-$; P—(X—$SO_3^-$)$_n$; Q-(X—$SO_3^-$)$_n$; $N^-(SO_2CF_3)_2$; $N^-(SO_2CF_2CF_3)_2$; $N(CN)_2^-$; $NH_2^-$; $^{Alk-(COO^-)}{}_n$; Ar—(COO$^-$)$_n$; ArAlk-(COO$^-$)$_n$; P—(X—COO$^-$)$_n$; Q-(X—COO$^-$)$_n$; $H_2PO_4^-$; $HPO_4^{2-}$; $H_2PO_2^-$; $PO_4^{3-}$; $P_2O_7^{4-}$; $P_3O_9^{3-}$; $P_3O_{10}^{5-}$; $P_4O_{13}^{2-}$; (AlkO)$_2$POO$^-$; P—(X—POO$^-$)$_n$; Q-(X—POO$^-$)$_n$; $NO_3^-$; $NO_2^-$; OCN$^-$; NCO$^-$; SCN$^-$; CNS$^-$; $CS_2^{2-}$; $CS_2^{2-}$; $N_3^-$; $CrO_4^{2-}$; $Cr_2O_7^{2-}$; $CrO_8^{3-}$; $MnO_4^-$; $SiO_3^{2-}$; $TiO_3^{2-}$; $MoO_4^-$; $ReO_4^-$; $WO_4^-$; $ClO_2^-$; $ClO_3^-$; $ClO_4^-$; BrO$^-$; $BrO_2^-$; $BrO_3^-$; $BrO_4^-$; I$^-$; IO$^-$; $IO_2^-$; $IO_3^-$; $IO_4^-$; [Co(CN)$_6$]$^{3-}$; [Fe(CN)$_6$]$^{3-}$; [Fe(CN)$_6$]$^{4-}$; [Cr(CN)$_6$]$^{3-}$; [Cu(CN)$_6$]$^{3-}$; [Ni(CN)$_6$]$^{2-}$; $B_4O_7^{2-}$; $BO_3^{3-}$; B(Ar)$_4^-$; $H_2SbO_4^-$; Sb(OH)$_6^-$; $Sb_2O_7^{4-}$; $HCO_3^-$; $CO_3^{2-}$; $SeO_4^{2-}$; $SeO_4^{2-}$; and SeCN$^-$, wherein P is a substituted or unsubstituted alicyclic or aromatic hydrocarbon $C_{10}$-$C_{60}$, or a substituted or unsubstituted alicyclic or aromatic heterocycle $C_{10}$-$C_{60}$ containing one or multiple atoms of O, N or S;

Q is a residue of an acid, direct, reactive, vat, disperse, sulfur, or solvent dye or a chromophore selected form the group consisting of azo, metal complex, benzimidazolone, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, pyranthrone, azomethines, methines, azacarbocyanines, enamines, hemicyanines, streptocyanines, styryls, zeromethines, mono-, di-, tri-, and tetraazamethine; caratenoids, arylmethane, xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones; rhodamines, neutrocyanines, diazahemicyanines, porphirines, pyronins, indigoids, indophenols, naphthalimides, and combinations thereof;

X is a simple bond, an Alk, Ar, or AlkAr;

wherein Alkyl is a substituted or unsubstituted $C_1$-$C_{18}$ linear or branched aliphatic hydrocarbon, or a substituted or unsubstituted $C_3$-$C_{10}$ alicycle hydrocarbon, or heterocycle including one or multiple atoms of O, N or S;

Aryl is a substituted or unsubstituted $C_4$-$C_{10}$ aromatic hydrocarbon or aromatic heterocycle including one or multiple atoms of O, N or S;

AlkylAryl is a combination of the Alkyl and Aryl groups; and n=1-6.

7. The colored conductive fluid of claim 2 wherein the agent for controlling the electrical conductivity of the colored conductive fluid is an ionic fluid.

8. The colored conductive fluid of claim 2 wherein the agent does not dissociate into monatomic ions with ionic radii smaller than 2.0 Å and polyatomic ions with ionic radii smaller than 1.45 Å.

9. The colored conductive fluid of claim 2 wherein the agent for controlling the electrical conductivity of the colored conductive fluid has a purity of at least 95.0%.

10. The colored conductive fluid of claim 1 wherein the polar solvent is selected from the group consisting of water, glycols, alcohols, polyols, ethers, esters, ketones, acetals, ketals, lactones, carbonates, lactams, urethanes, ureas, pyrrolidines, pyrrolidones, sulfones, sulfoxides, amides, primary, secondary, tertiary, or quaternary amines, imines, nitriles, carboxylic acids, aldehydes, halogenated, thio, or nitro compounds, and any combinations thereof.

11. The colored conductive fluid of claim 1 wherein the polar solvent is selected from one or more of the following formulas:

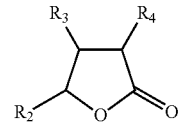

(1)

(2)
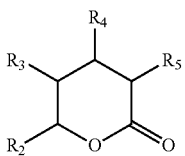

(3)
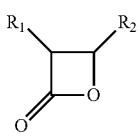

(4)
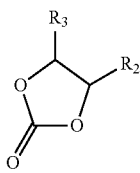

(5)
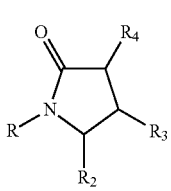

(6)
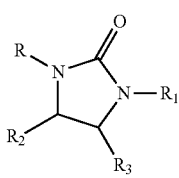

(7)
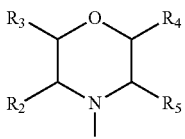

(8)
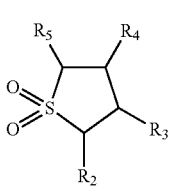

(9)
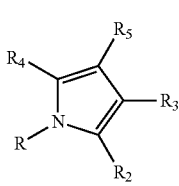

wherein R and $R_1$ independently are H, a $C_1$-$C_{12}$ Alkyl (Alk), or $(RR_1O)_nH$;

$R_2$, $R_3$, $R_4$, and $R_5$ independently are H, $C_1$-$C_{12}$ Alk, halogen, OH, OAlk, SAlk, COOR, =O, $CH_3C$=O, CN, $NRR_1$, $COO(RR_1O)_nR$, $O(RR_1O)_nH$, or $NRR_1(RR_1O)_nH$; and n=1-50.

12. The colored conductive fluid of claim 1 wherein the polar solvent is selected from the group consisting of water, methanol, ethanol, isopropanol, n-propanol, 1,2-propylene glycol, 1,3-propylene glycol, 1,4-butylene glycol, diethylene glycol, dipropylene glycol, ethylene carbonate, propylene carbonate, 1,2-butylene carbonate, 1,2-cyclohexane carbonate, glycerine carbonate, dimethyl carbonate, diethyl carbonate, acetone, acetophenone, pyridine, dimethyl malonate, diacetone alcohol, hydroxypropyl carbamate, beta-hydroxyethyl carbamate, formamide, N-methyl formamide, dimethylformamide, N-methyl acetamide, dimethylacetamide, dimethylsulfoxide, sulfolane, 2-pyrrolidone, N-methyl-2-pyrrolidone, N-cyclohexyl-2-pyrrolidone, acetonyl acetone, cyclohexanone, ethyl acetoacetate, ethyl-L-lactate, pyrrole, N-methyl pyrrole, N-ethyl pyrrole, 4H-pyran -4-one, 1,3-dimethyl-2-imidazolidinone, morpholine, N-methylmorpholine, N-ethylmorpholine, N-formylmorpholine, beta-propiolactone, beta-valerolactone, beta -hexalactone, gamma-butyrolactone, gamma-valerorolactone, gamma-hexalactone, gamma-heptalactone, gamma-octalactone, gamma-nonalactone, gamma-decalactone, delta-valerolactone, delta-hexalactone, delta-heptalactone, delta-octalactone, delta -nonalactone, delta-decalactone, delta-tetradecalactone, delta-octadecolactone, and any combination thereof.

13. The colored conductive fluid of claim 1 wherein the colorant is the pigment.

14. The colored conductive fluid of claim 13 wherein the pigment includes a plurality of particles having a mean weight diameter from 10 nm to 5000 nm.

15. The colored conductive fluid of claim 13 wherein the pigment is a self-dispersed pigment.

16. The colored conductive fluid of claim 1 wherein the colorant is the dye.

17. The colored conductive fluid of claim 1 further comprising at least one dispersant, extender, synergist, surfactant, resin, polymer, biocide, or any combination thereof.

18. The colored conductive fluid of claim 1 comprising 50.0 wt % to 99.9 wt % polar solvent and 0.1 wt % to 50.0 wt % colorant, based on a total weight of the colored fluid.

19. The colored conductive fluid of claim 2 wherein the agent for controlling the electrical conductivity of the colored conductive fluid is present in an amount from 0.01 wt % to 10.0 wt %, based on a total weight of the colored fluid.

20. The colored conductive fluid of claim 1 is devoid of a non-polar solvent.

21. The colored polar fluid of claim 1 having an electrical conductivity from about 5 µS/cm up to 3000 µS/cm.

22. The colored polar fluid of claim 1 having no more than 300 total ppm of monatomic ions with ionic radii smaller than 2.0 Å and polyatomic ions with ionic radii smaller than 1.45 Å.

23. The colored polar fluid of claim 1 having a dynamic viscosity at 25° C. of 0.01 to 1000 cp and an electrowetting relative response of 10% to 80%.

24. The colored polar fluid of claim 1 wherein the polar solvent further has a dielectric constant equal to or greater than 10.

25. An electrowetting or electrofluidic device including the colored conductive fluid of claim 1.

26. The electrowetting or electrofluidic device of claim 25 comprising: a plurality of electrodes configured to apply a voltage potential difference effective to move the colored conductive fluid relative to at least one of the electrodes.

27. The electrowetting or electrofluidic device of claim 25 further comprising: a non-polar fluid that is immiscible with the colored conductive fluid.

28. The electrowetting or electrofluidic device of claim 25 wherein the device is a pixel in a display.

29. A colored conductive fluid comprising:
at least one polar solvent having (a) a dynamic viscosity of 0.1 cP to 1000 cP at 25° C., (b) a surface tension of 25 dynes/cm to 90 dynes/cm at 25° C., and (c) an electrowetting relative response of 20% to 80%, and
at least one colorant selected from a pigment and/or a dye,
wherein the colored conductive fluid does not cause electrical breakdown of a poly(2-chloro-paraxylylene) dielectric having a thickness of 400 nm at an applied voltage up to 15V, or wherein the colored conductive fluid does not cause electrical breakdown of an alumina dielectric having a thickness of 100 nm at an applied voltage up to 15V, wherein the colored conductive fluid has an electrical conductivity from 0.1 μS/cm to 3,000 μS/cm, and wherein the colored conductive fluid has no more than 500 total ppm of monatomic ions with ionic radii smaller than 2.0 Å and polyatomic ions with a ionic radii smaller than 1.45 Å.

30. The colored polar fluid of claim 29 wherein the colored conductive fluid has an electrical conductivity from 0.1 μS/cm to 3,000 μS/cm and has no more than 500 total ppm of monatomic ions with ionic radii smaller than 2.0 Å and polyatomic ions with ionic radii smaller than 1.45 Å.

31. The colored polar fluid of claim 29 wherein the colored conductive fluid does not cause electrical breakdown of a poly(2-chloro-paraxylylene) dielectric having a thickness of 400 nm at an applied voltage up to 30V, or wherein the colored conductive fluid does not cause electrical breakdown of an alumina dielectric having a thickness of 100 nm at an applied voltage up to 30V.

32. The colored polar fluid of claim 29 wherein the colored conductive fluid does not cause electrical breakdown of a poly(2-chloro-paraxylylene) dielectric having a thickness of 400 nm at an applied voltage up to 50V, or wherein the colored conductive fluid does not cause electrical breakdown of an alumina dielectric having a thickness of 100 nm at an applied voltage up to 50V.

33. An electrowetting or electrofluidic device including the colored conductive fluid of claim 29.

* * * * *